US009536274B2

(12) United States Patent
Iwagaki et al.

(10) Patent No.: US 9,536,274 B2
(45) Date of Patent: Jan. 3, 2017

(54) DRAWING PROCESSOR, DRAWING PROCESSING SYSTEM, AND DRAWING PROCESSING METHOD

(71) Applicant: Sony Computer Entertainment Inc., Tokyo (JP)

(72) Inventors: Taruhi Iwagaki, Tokyo (JP); Michel Xavier, Tokyo (JP); Osamu Ota, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 135 days.

(21) Appl. No.: 14/220,568

(22) Filed: Mar. 20, 2014

(65) Prior Publication Data
US 2014/0292783 A1   Oct. 2, 2014

(30) Foreign Application Priority Data

Apr. 1, 2013   (JP) .................................. 2013-076188

(51) Int. Cl.
*G06T 1/20* (2006.01)
*G06T 1/00* (2006.01)
(52) U.S. Cl.
CPC ........................................ *G06T 1/00* (2013.01)
(58) Field of Classification Search
CPC .......... G06T 15/005; G06T 1/20; G06T 15/04; G09G 5/363; G06F 3/14
See application file for complete search history.

(56) References Cited

U.S. PATENT DOCUMENTS

| 6,167,382 A * | 12/2000 | Sparks .............. G06Q 30/0277 |
| | | 705/14.73 |
| 8,269,782 B2 | 9/2012 | Washizu |
| 2006/0290974 A1 | 12/2006 | Kano |
| 2008/0278509 A1 | 11/2008 | Washizu |

(Continued)

FOREIGN PATENT DOCUMENTS

| JP | 07129783 A | 5/1995 |
| JP | 2000057370 A | 2/2000 |

(Continued)

OTHER PUBLICATIONS

Office Action for corresponding JP Patent Application No. 2013-076188, dated Feb. 10, 2015.

*Primary Examiner* — Todd Buttram
(74) *Attorney, Agent, or Firm* — Matthew B. Dernier, Esq.

(57) ABSTRACT

Disclosed herein is a drawing processing apparatus including: a drawing library section adapted to transmit a drawing command via a network; and a data transmission management section adapted to transmit reusable data, used to execute the drawing command, via the network at a time different from when the drawing command is transmitted. Also disclosed herein is a drawing processing apparatus including: a data reception management section adapted to receive reusable data, used to execute a drawing command, via a network at a time different from when the drawing command is received; and a drawing library section adapted to set the reusable data, received by the data reception management section, in a graphics processor as a resource and adapted to receive the drawing command via the network and supply the drawing command to the graphics processor.

7 Claims, 19 Drawing Sheets

(56) References Cited

U.S. PATENT DOCUMENTS

| | | | | |
|---|---|---|---|---|
| 2010/0250120 A1* | 9/2010 | Waupotitsch | ......... | G06T 3/4038 |
| | | | | 701/408 |
| 2010/0321399 A1* | 12/2010 | Ellren | ............... | G06F 17/30241 |
| | | | | 345/587 |
| 2011/0304625 A1* | 12/2011 | Gerhard | .................. | G06T 11/00 |
| | | | | 345/428 |
| 2013/0147842 A1* | 6/2013 | Zhu | ........................ | G09G 5/373 |
| | | | | 345/636 |

FOREIGN PATENT DOCUMENTS

| | | | |
|---|---|---|---|
| JP | 2007006020 A | | 1/2007 |
| JP | 2008123520 | | 5/2008 |
| JP | 2009140378 A | * | 6/2009 |

\* cited by examiner

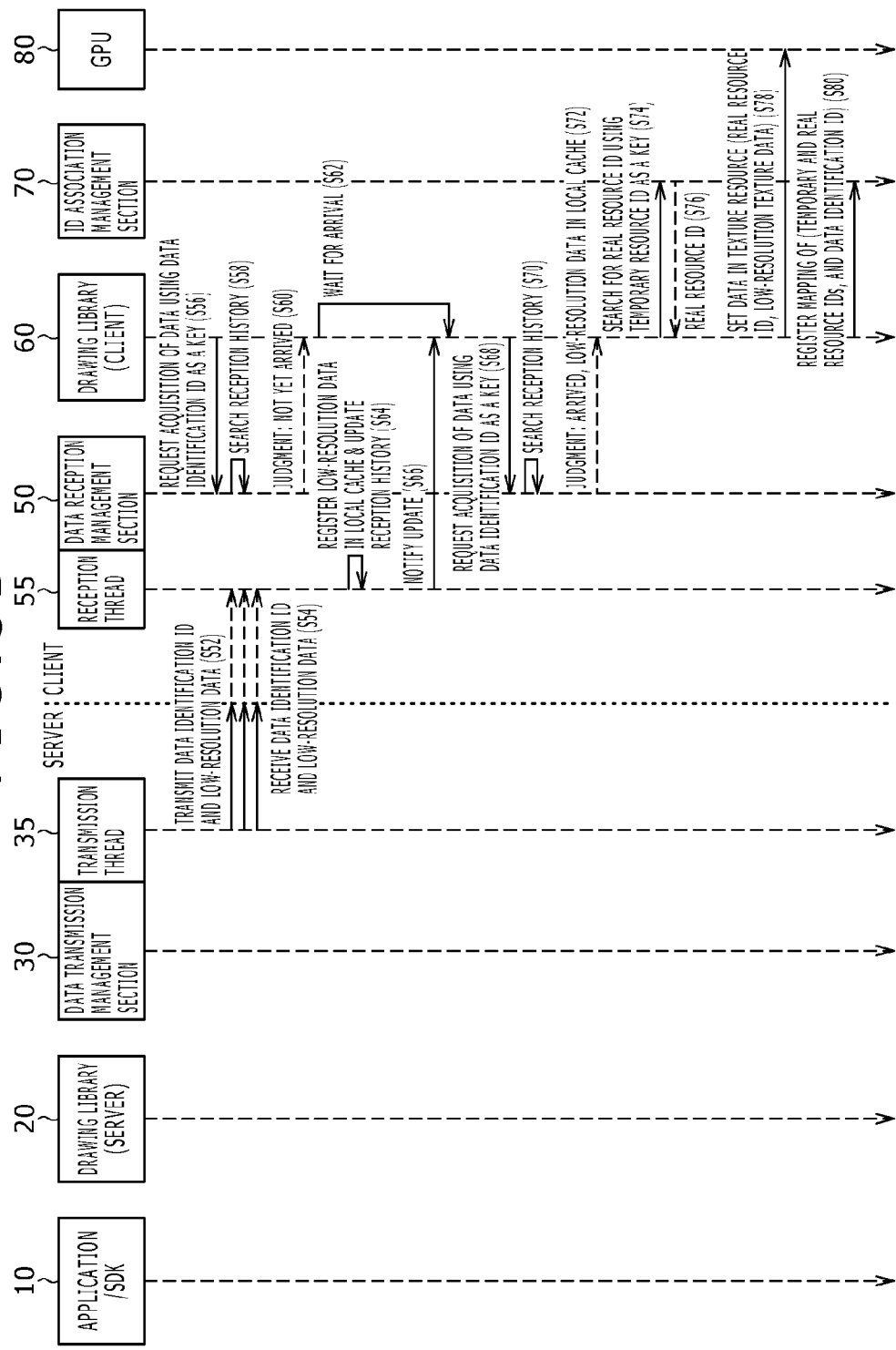

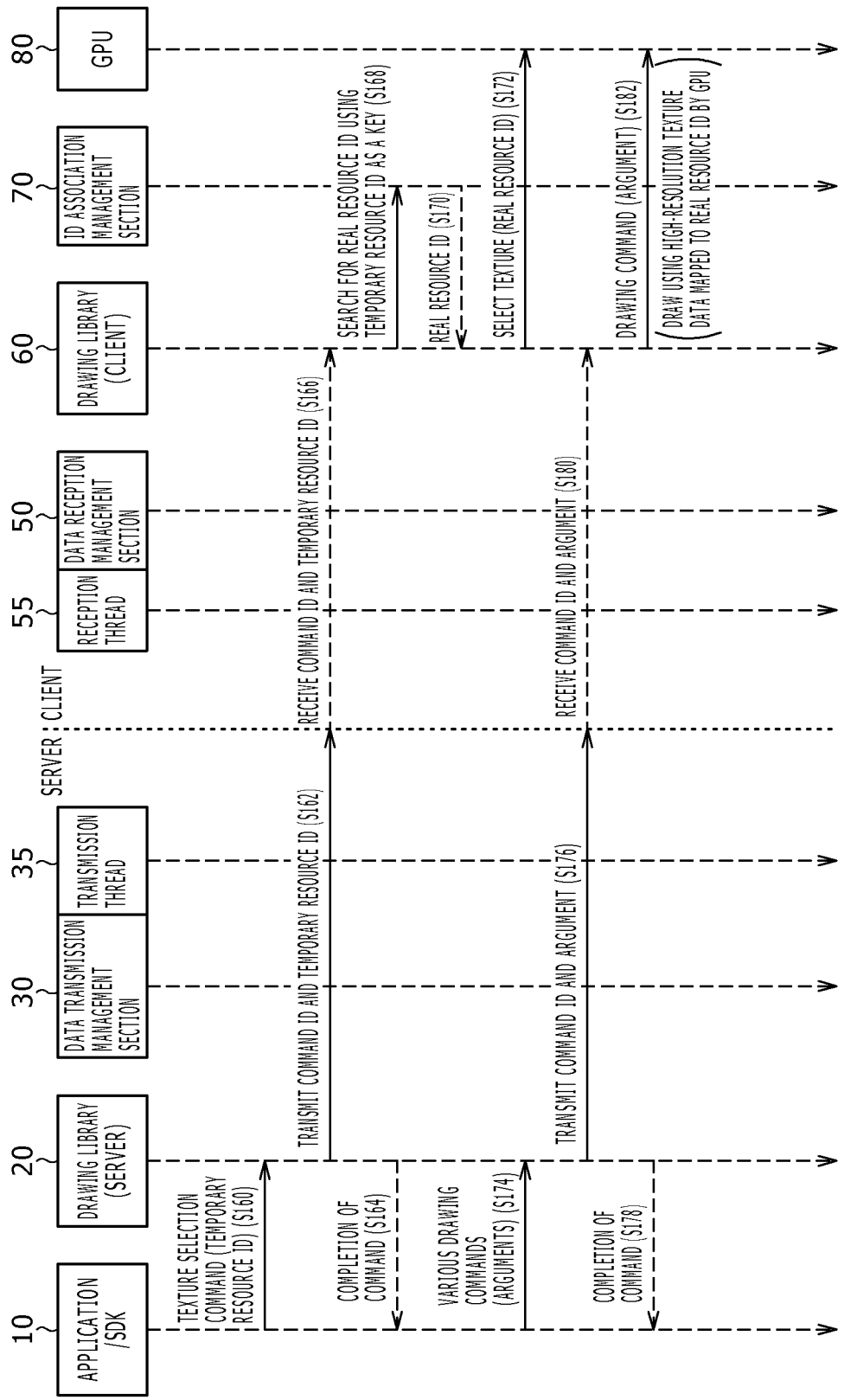

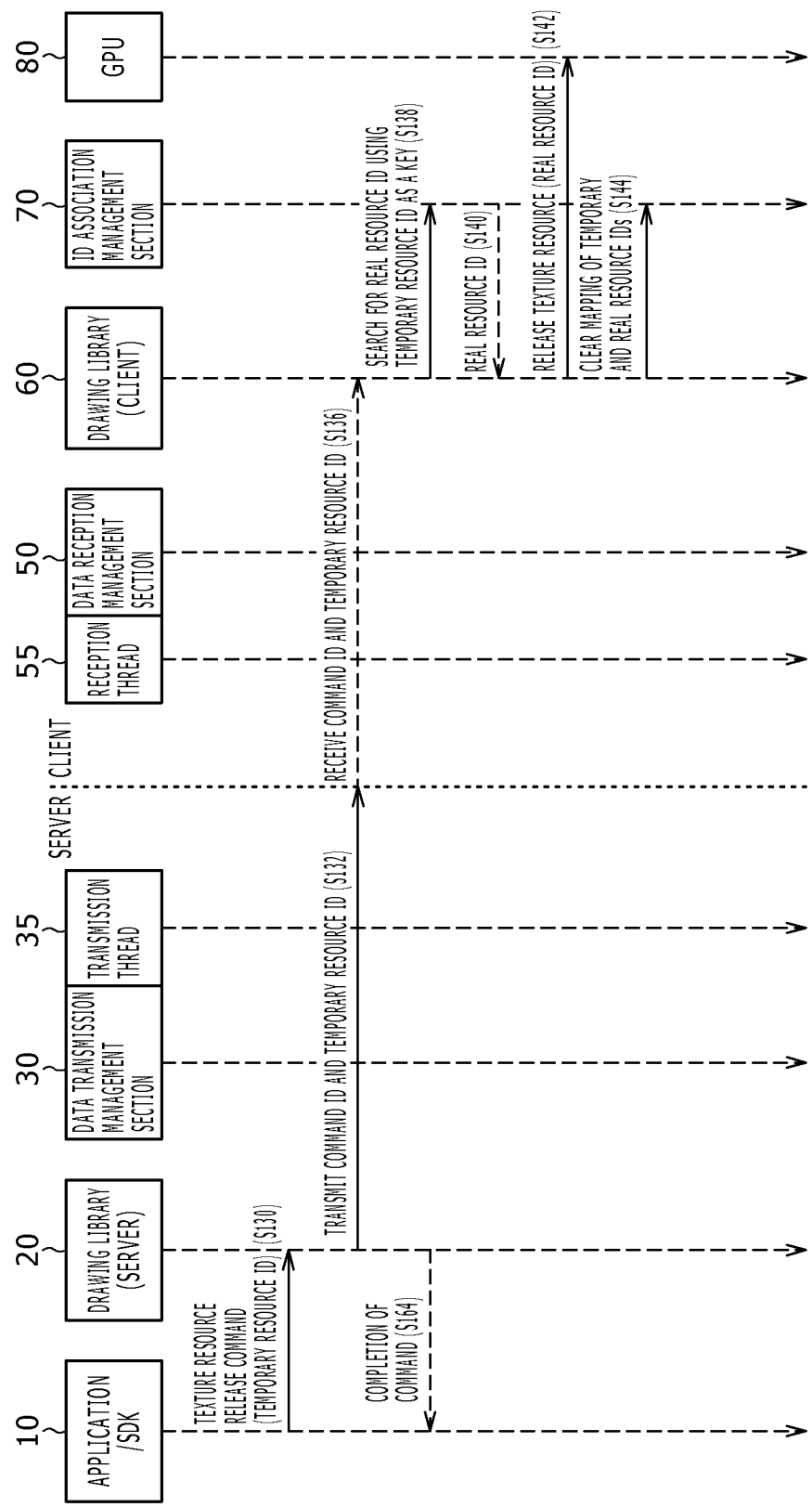

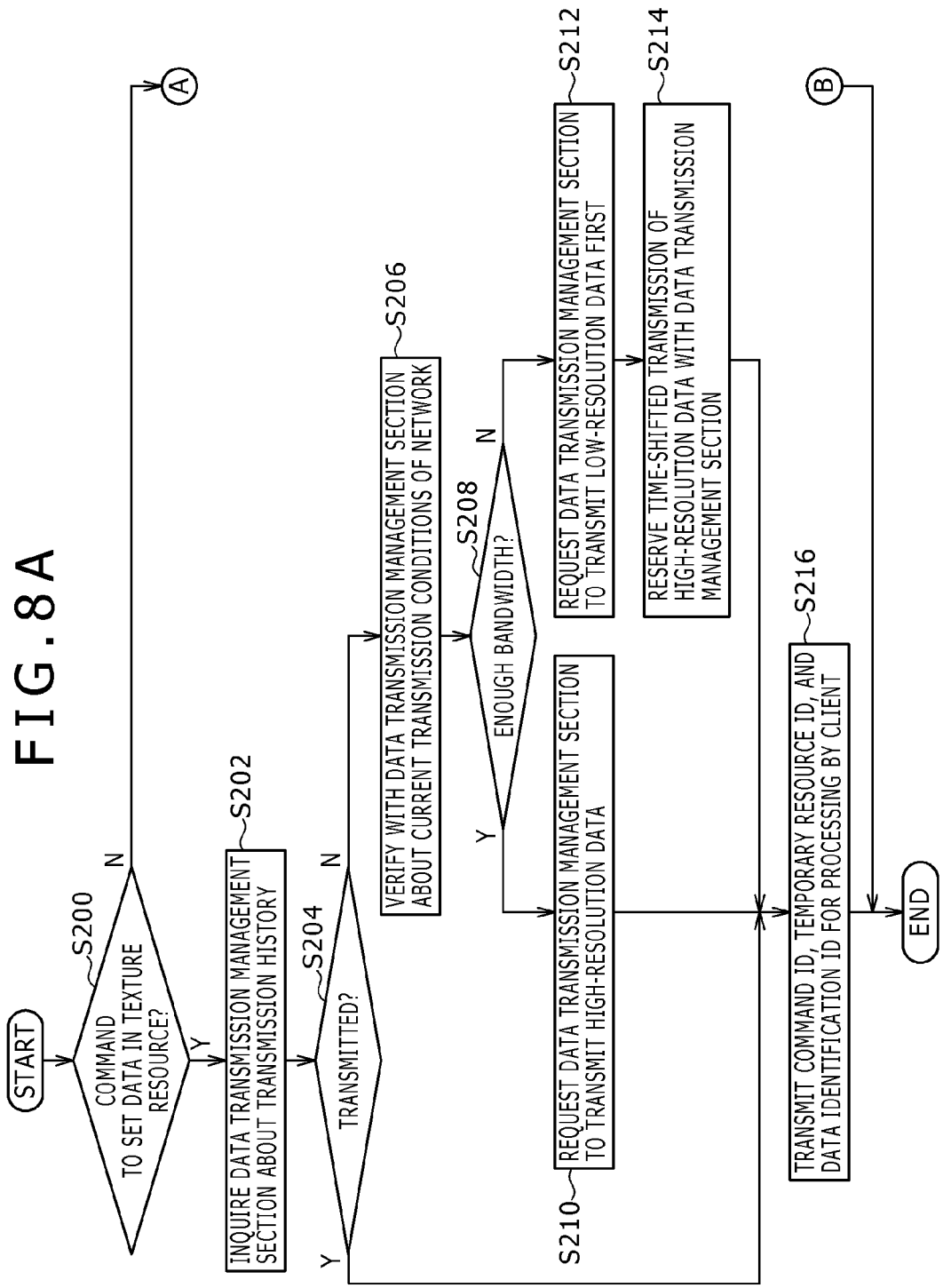

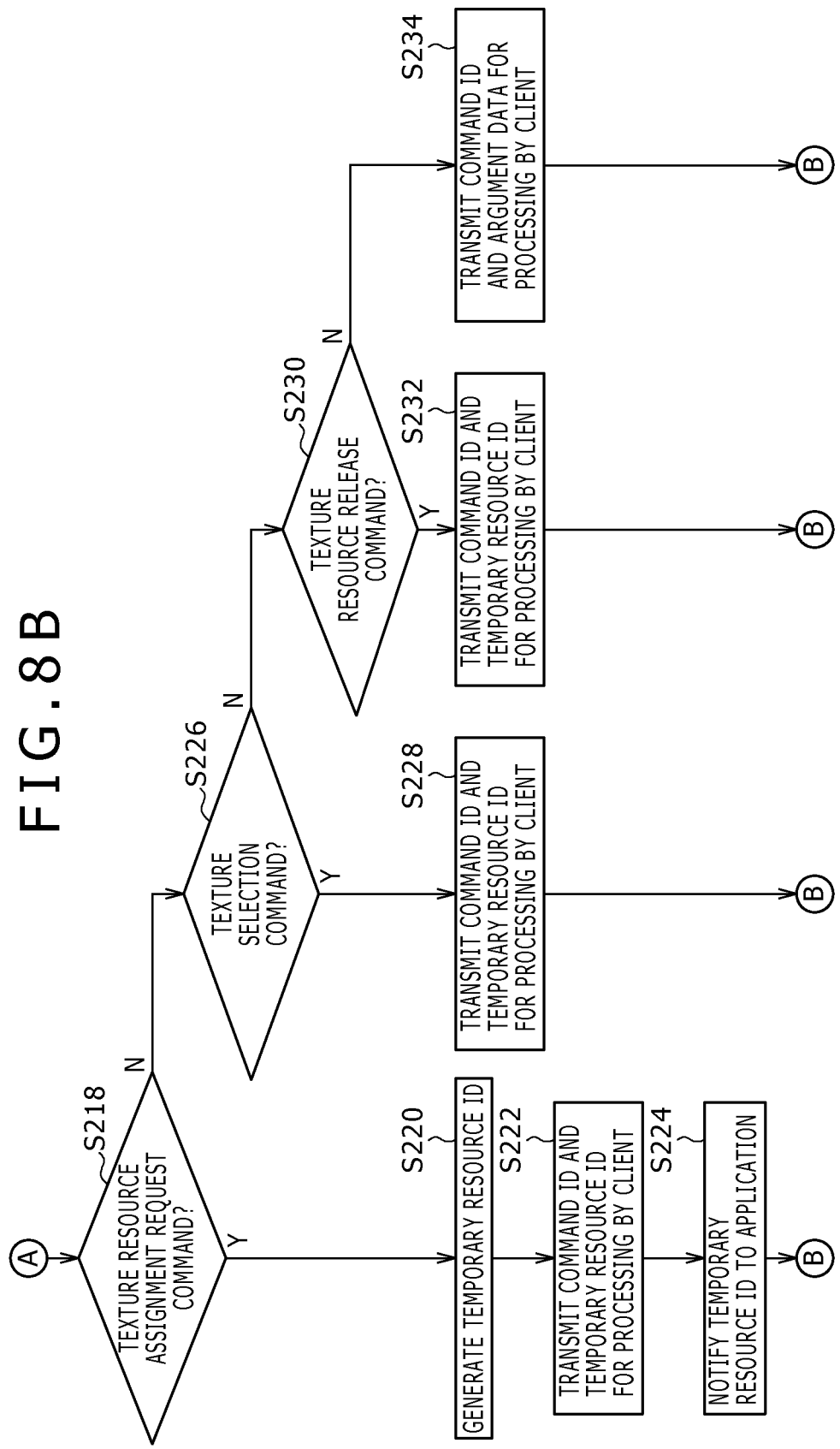

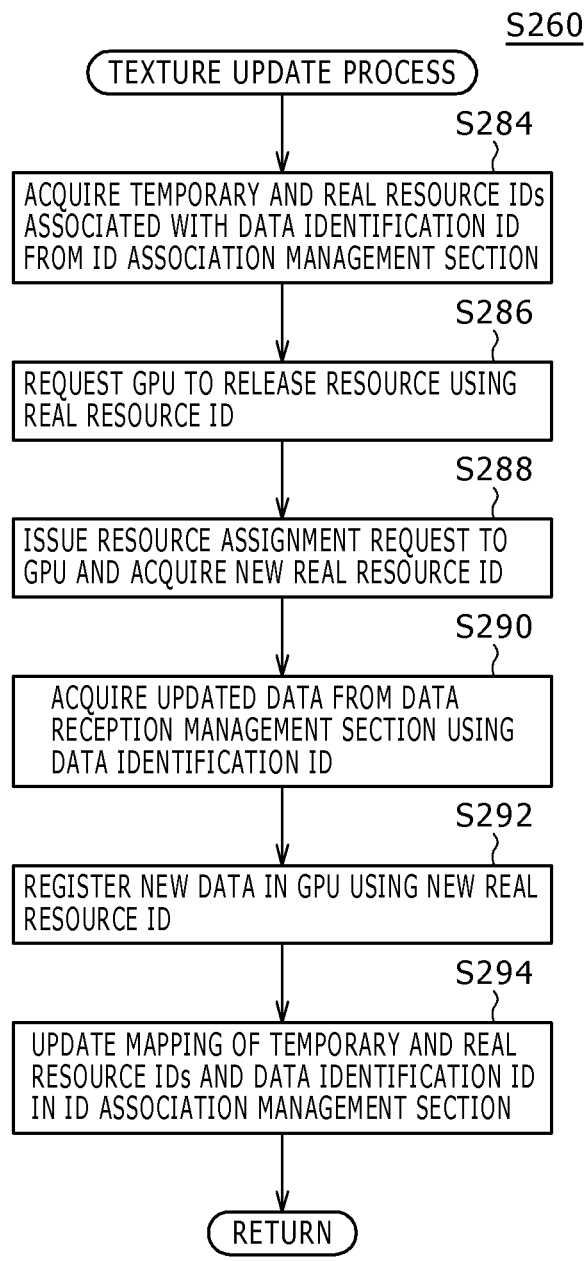

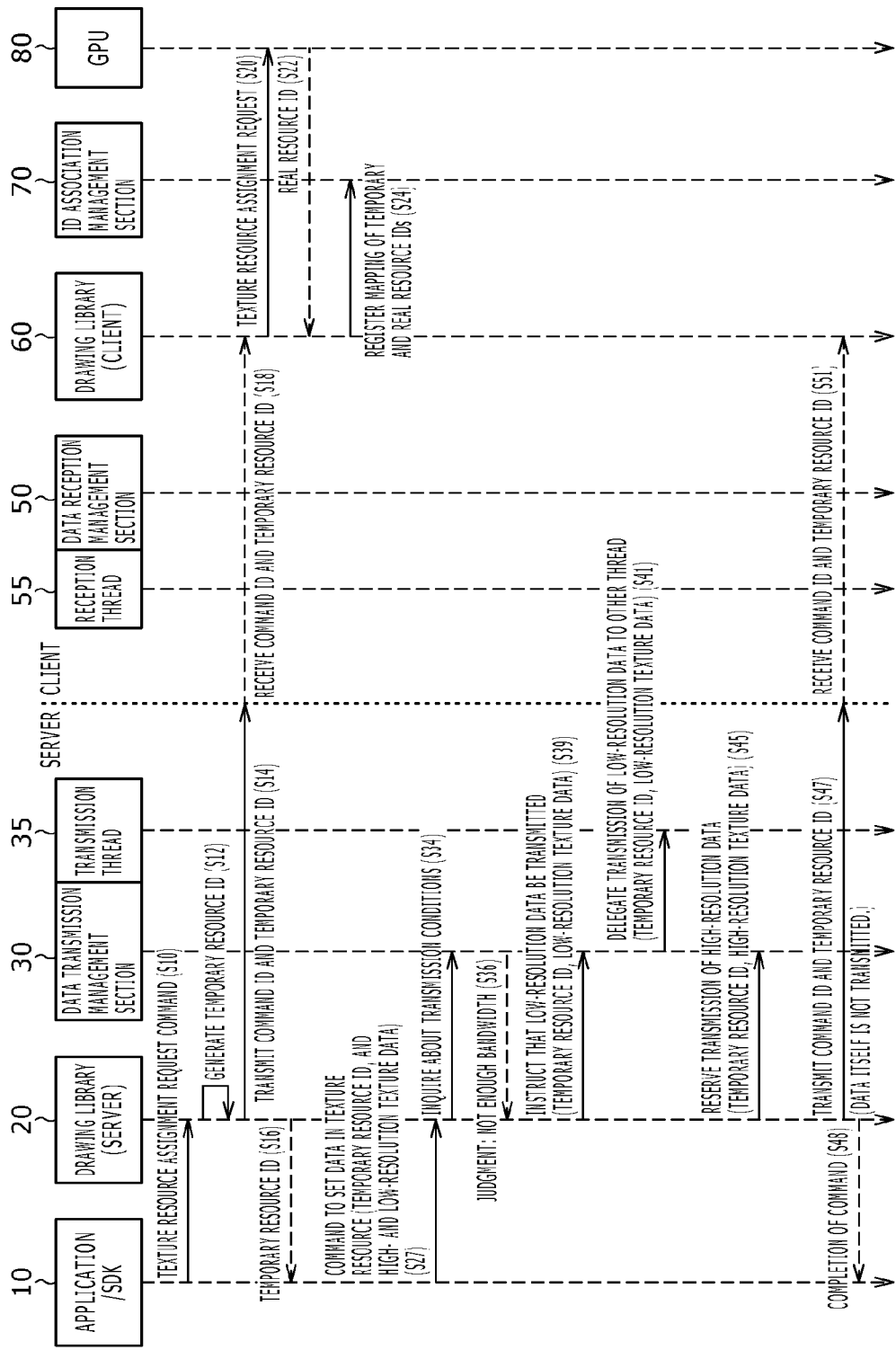

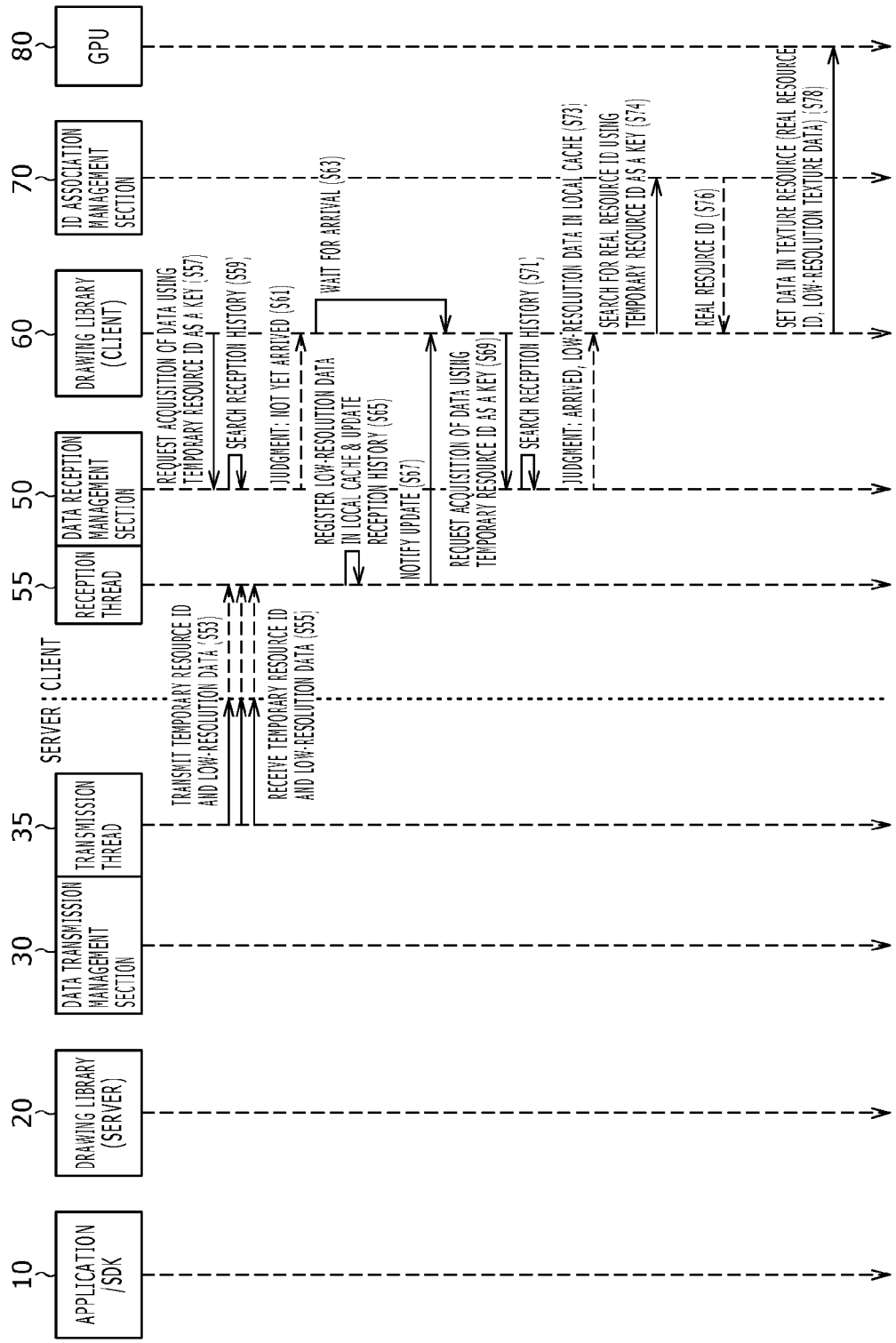

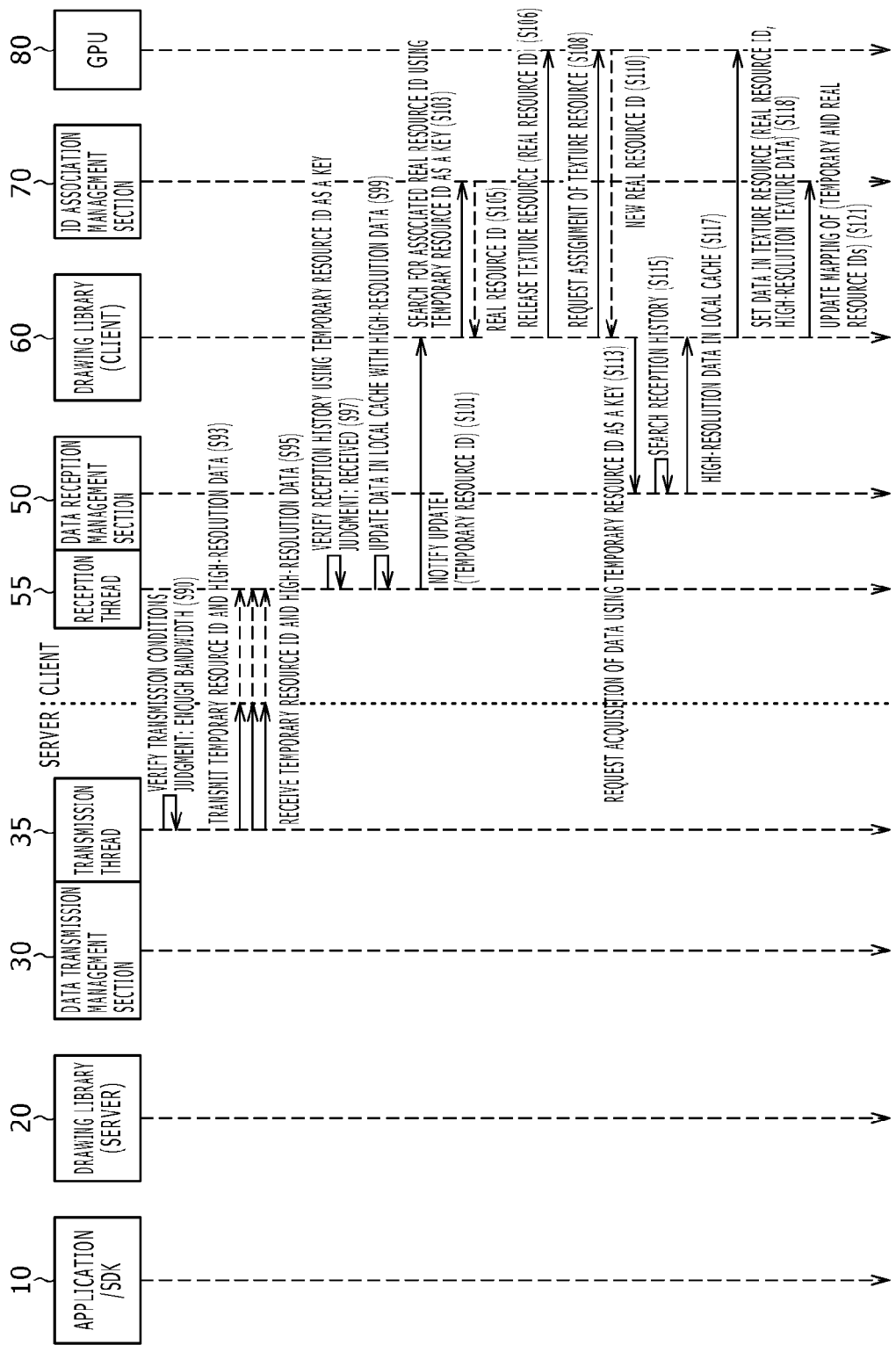

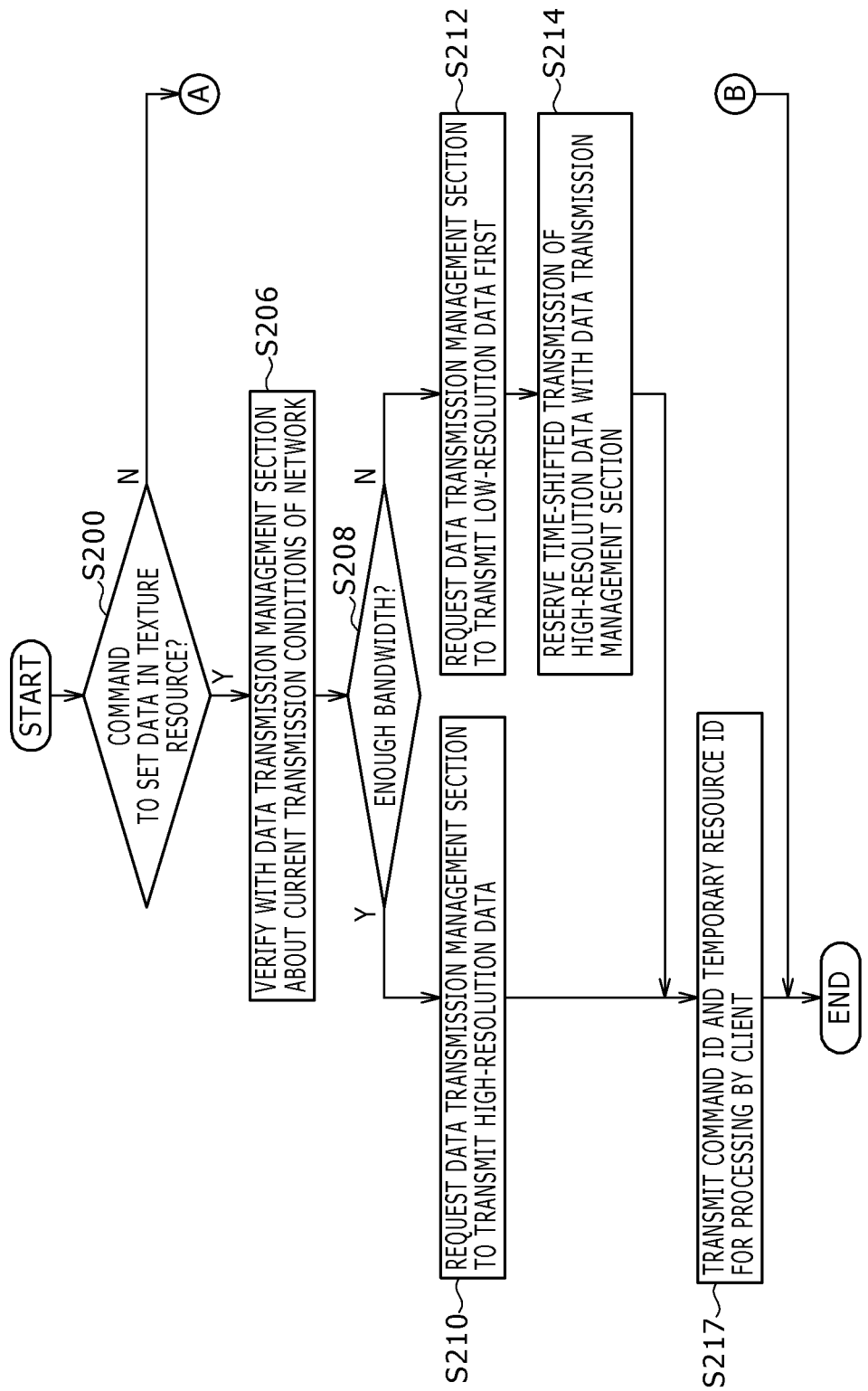

DRAWING PROCESSOR, DRAWING PROCESSING SYSTEM, AND DRAWING PROCESSING METHOD

BACKGROUND

The present disclosure relates to a drawing processing technology, and more particularly to a technology for presenting a drawing command and data used by the drawing command.

In personal computers and game consoles, the use of high-image quality graphics has become pervasive. Among examples of these are executing an application such as a game or a simulation using high-quality three-dimensional computer graphics and playing video content generated by combining real images and computer graphics.

In general, graphics is processed by a central processing unit (CPU) and a graphics processing unit (GPU) operating in a coordinated manner. The CPU is a general-purpose processor designed to perform general-purpose operations. In contrast, the GPU is a dedicated processor designed to perform high-level graphics operations. The CPU handles geometry operations such as projection transform based on a three-dimensional model of an object. The GPU receives vertex data from the CPU and performs rendering. The GPU includes dedicated hardware such as a rasterizer and a pixel shader, performing graphics processing through pipelining.

Some recent GPUs are called program shaders. As this name suggests, these GPUs have a programmable shader function. In order to support shader programming, a graphics library is commonly supplied. When an object is rendered, it is necessary for the CPU to generate graphics commands to be executed by the GPU hardware one after another and hand them over to the GPU.

In connection with the related art, the reader is requested to refer to Japanese Patent Laid-Open No. 2008-123520.

SUMMARY

In the case of an application using a network, graphics commands and data are transmitted from a server to a client via the network so that a drawing process is performed by the client side. In the event of frequent data retransmission due to insufficient network bandwidth or communication error, the drawing process is delayed, thus resulting in poor responsiveness of the application. If data retransmission occurs frequently in a game application for which realtimeness is necessary in particular, the progress of the game is delayed, possibly impairing a realistic sensation.

In light of the foregoing, it is desirable to provide a technology for efficiently performing a drawing process using a network.

According to an embodiment of the present disclosure, there is provided a drawing processing apparatus that includes a drawing library section and a data transmission management section. The drawing library section transmits a drawing command via a network. The data transmission management section transmits reusable data, used to execute the drawing command, via the network at a time different from when the drawing command is transmitted.

Another embodiment of the present disclosure is also a drawing processing apparatus. This apparatus includes a data reception management section and a drawing library section. The data reception management section receives reusable data, used to execute a drawing command, via a network at a time different from when the drawing command is received. The drawing library section sets the reusable data, received by the data reception management section, in a graphics processor as a resource. The drawing library section also receives the drawing command via the network and supplies it to the graphics processor.

Still another embodiment of the present disclosure is a drawing processing system. This system includes a server and a client. The server transmits a drawing command via a network. The client receives the drawing command from the server. The server includes a server-side drawing library section and a data transmission management section. The server-side drawing library section transmits the drawing command to the client. The data transmission management section transmits, to the client, reusable data, used to execute the drawing command, at a time different from when the drawing command is transmitted. The client includes a data reception management section and a client-side drawing library section. The data reception management section receives, from the server, the reusable data used to execute the drawing command. The client-side drawing library section sets the reusable data, received by the data reception management section, in a graphics processor as a resource. The client-side drawing library section also receives the drawing command from the server and supplies it to the graphics processor.

Still another embodiment of the present disclosure is a drawing processing method. This method includes transmitting a drawing command via a network. The method further includes transmitting reusable data, used to execute the drawing command, via a network at a time different from when the drawing command is transmitted. The method still further includes receiving the reusable data used to execute the drawing command. The method still further includes setting the received reusable data in a graphics processor as a resource, receiving the drawing command via the network, and supplying it to the graphics processor.

It should be noted that any combinations of the above components and any conversions of expressions of the present disclosure between "method," "device," "system," "computer program," "data structure," "recording medium" and so on are also effective as embodiments of the present disclosure.

The present disclosure allows to efficiently perform a drawing process using a network.

BRIEF DESCRIPTION OF THE DRAWINGS

FIG. 3B is a sequence diagram illustrating the flow of texture registration by the drawing processing system shown in FIG. 1;

FIG. 6 is a sequence diagram illustrating a flow of a drawing process following replacement of texture data as a result of the texture update shown in FIG. 5;

FIG. 7 is a sequence diagram illustrating a flow of texture deletion by the drawing processing system shown in FIG. 1;

FIG. 8A is a flowchart illustrating a process performed by a drawing library of a server shown in FIG. 1;

FIG. 8B is a flowchart illustrating the process performed by the drawing library of the server shown in FIG. 1;

FIG. 9C is a flowchart illustrating the process performed by the drawing library of the client shown in FIG. 1;

FIG. 10A is a sequence diagram illustrating another flow of texture registration by the drawing processing system shown in FIG. 1;

FIG. 10B is a sequence diagram illustrating the flow of texture registration by the drawing processing system shown in FIG. 1;

FIG. 11 is a sequence diagram illustrating another flow of texture update by the drawing processing system shown in FIG. 1;

FIG. 12 is a flowchart illustrating another process performed by the drawing library of the server;

DETAILED DESCRIPTION OF THE PREFERRED EMBODIMENTS

Figure 1:
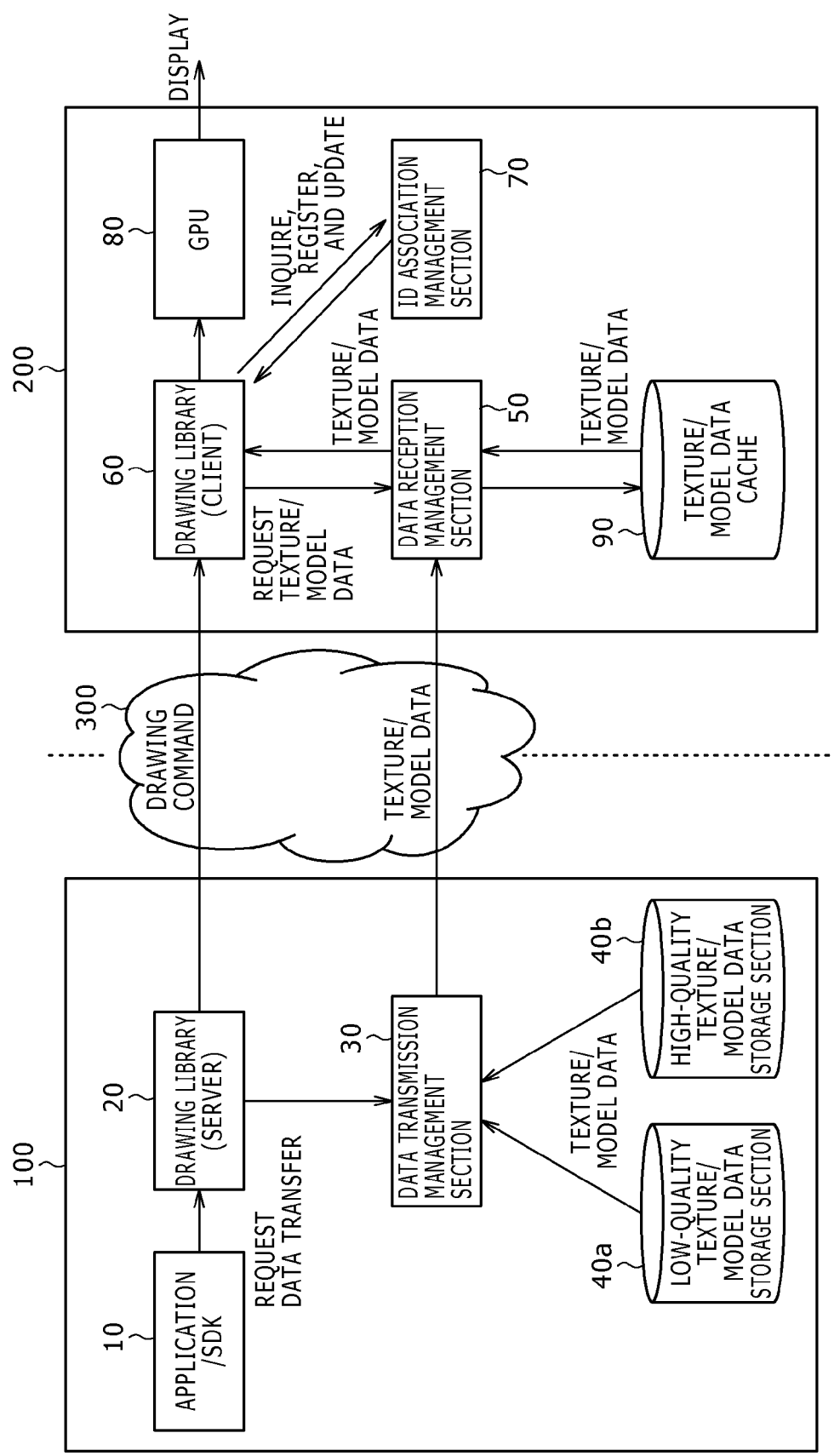
FIG. 1 is a configuration diagram of a drawing processing system according to an embodiment.

FIG. 1 is a configuration diagram of a drawing processing system according to an embodiment. A server 100 and a client 200 are connected via a network 300. Functional blocks of the server 100 and the client 200 can be implemented in various manners by hardware alone, software alone, or a combination thereof.

The server 100 transmits a drawing command and data separately to the client 200. Data, in particular reusable static data such as texture data, model data and shader program, is transmitted separately from a drawing command. It should be noted that dynamic data that is not reused may be transmitted together with a drawing command.

The server 100 includes an application/SDK (Software Development Kit) 10, a drawing library 20, a data transmission management section 30, a low-quality texture/model data storage section 40a, and a high-quality texture/model data storage section 40b.

The application/SDK 10 is an application program such as a game that has been created by using a variety of drawing commands of the drawing library 20. The low-quality texture/model data storage section 40a and the high-quality texture/model data storage section 40b store geometry data (model data) and textures used for mapping on polygon surfaces. Geometry data include, for example, vertex coordinate values, vertex colors, normal vectors, UV values of polygons of objects. Geometry data and textures are used by the application/SDK 10.

The drawing library 20 transmits a drawing command to the client 200 via the network 300 and issues, to the data transmission management section 30, a request for transfer of static data that can be reused for the drawing command.

The data transmission management section 30 reads static data such as texture and model data from the low-quality texture/model data storage section 40a or high-quality texture/model data storage section 40b, transmitting the data to the client 200. Texture and model data is used for execution of the drawing command. The low-quality texture/model data storage section 40a stores texture and model data of low drawing quality, whereas the high-quality texture/model data storage section 40b stores texture and model data of high drawing quality. The data transmission management section 30 can select either one of them in accordance with the congestion condition of the network 300, the processing capability of the client 200, and other factors. For example, low resolution texture data is selected if the network 300 is in heavy traffic or if the client 200 is limited in processing capability. On the other hand, high resolution texture data is selected if the network 300 has enough bandwidth or if the client 200 is a high-performance terminal.

The client 200 includes a data reception management section 50, a drawing library 60, an identification (ID) association management section 70, a graphics processing unit (GPU) 80, and a texture/model data cache 90.

The drawing library 60 receives a drawing command from the server 100. The same library 60 requests, to the data reception management section 50, texture and model data used for execution of the drawing command.

The data reception management section 50 receives texture and model data from the server 100 and stores it in the texture/model data cache 90. The data reception management section 50 supplies, to the drawing library 60, texture and model data used for execution of the drawing command in response to the request from the same library 60.

The ID association management section 70 manages resource IDs, resource identification information necessary for execution of the drawing command. The drawing library 20 of the server 100 generates a temporary resource ID, temporary identification information of a resource used for execution of the drawing command, supplying the temporary resource ID to the drawing library 60 of the client 200. The drawing library 60 of the client 200 requests the GPU 80 to assign the resource necessary for execution of the drawing command. The same library 60 receives, from the GPU 80, a real resource ID, identification information of the resource that has been actually assigned by the GPU 80. The drawing library 60 of the client 200 supplies, to the ID association management section 70, mapping information that associates the temporary resource ID with the real resource ID.

The ID association management section 70 manages the temporary and real resource IDs in association with each other and receives a search inquiry from the drawing library 60. When the drawing library 60 requests the ID association management section 70 to search for a real resource ID using a temporary resource ID as a key, the same section 70 returns the real resource ID associated with the temporary resource ID.

Further, as an option, the drawing library 60 of the client 200 receives, from the drawing library 20 of the server 100, a data identification ID, identification information that uniquely identifies texture and model data. The ID association management section 70 manages the data identification ID in association with temporary and real resource IDs. When the drawing library 60 requests the ID association management section 70 to search for temporary and real resource IDs using a data identification ID as a key, the same section 70 returns the temporary and real resource IDs associated with the data identification ID.

The drawing library 60 acquires, from the ID association management section 70, the real resource ID associated with the temporary resource ID received from the drawing library 20 of the server 100. The same library 60 requests the GPU 80 to set texture and model data, stored in the texture/model data cache 90, in the real resource ID acquired from the ID association management section 70. The GPU 80 assigns texture and model data to the resource identified by the real resource ID.

The drawing library 60 requests the GPU 80 to execute the drawing command. The GPU 80 executes the drawing command using the texture and model data mapped to the real resource ID, showing the rendering result on a display.

Figure 2:
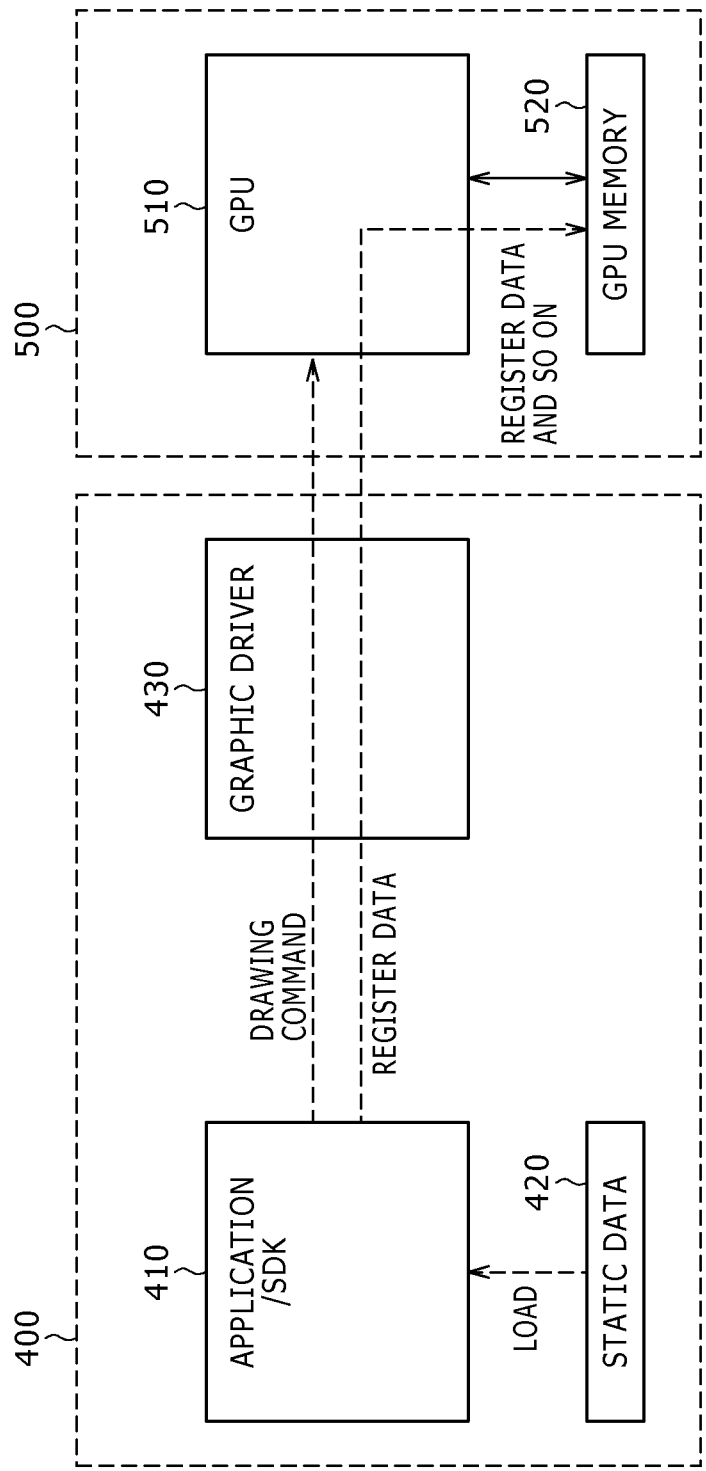
FIG. 2 is a hardware configuration diagram of a graphics processing apparatus in related art.

FIG. 2 is a hardware configuration diagram of a graphics processing apparatus in related art. A description will be given of this apparatus as a premise for understanding the drawing processing system in the present embodiment. In the case of recent GPUs, it is common that data is registered in advance in the GPU's local memory rather than the CPU handing over data for each drawing command one after another to the GPU for drawing. This is because, since the GPU has enough memory capacity, it is possible to read data from the GPU memory for use simply by registering data in advance in the GPU memory and specify a drawing command to the GPU.

A graphics processing apparatus in related art has a host CPU 400 and a GPU chip 500 that are connected by an interface such as a bus. The host CPU 400 supplies a drawing command and data to the GPU chip 500.

In the host CPU 400, an application/SDK 410 issues a drawing command to a GPU 510 through a graphic driver 430. The application/SDK 410 also loads static data 420, used for the drawing command, from a main memory and supplies the data to the GPU 510. The GPU 510 registers the static data 420 in a GPU memory 520. The GPU 510 reads the same data 420 from the GPU memory 520 when executing the drawing command.

The drawing processing system in the present embodiment is premised on having a graphics processing apparatus architecture that allows registration of data in the GPU memory 520 in advance. The drawing processing system has the host CPU 400 on the side of the server 100 and the GPU chip 500 on the side of the client 200 with the server 100 and the client 200 connected via the network 300.

A description will be given below of a drawing process handled by the drawing processing system according to the present embodiment in which a command and data are transmitted separately. However, there are two types of implementations, one in which a data identification ID is used which uniquely identifies data, and the other in which no data identification ID is used. It is necessary to selectively use either of them according to the working example. A description will be given first of [A] implementation using a data identification ID, followed by [B] implementation not using any data identification ID.

[A] Implementation Using Data Identification ID

A description will be given of the implementation using a data identification ID with reference to FIGS. 3A to 9C. In this case, temporary and real resource IDs and a data identification ID are managed in association with one another as described later.

Figure 3A:
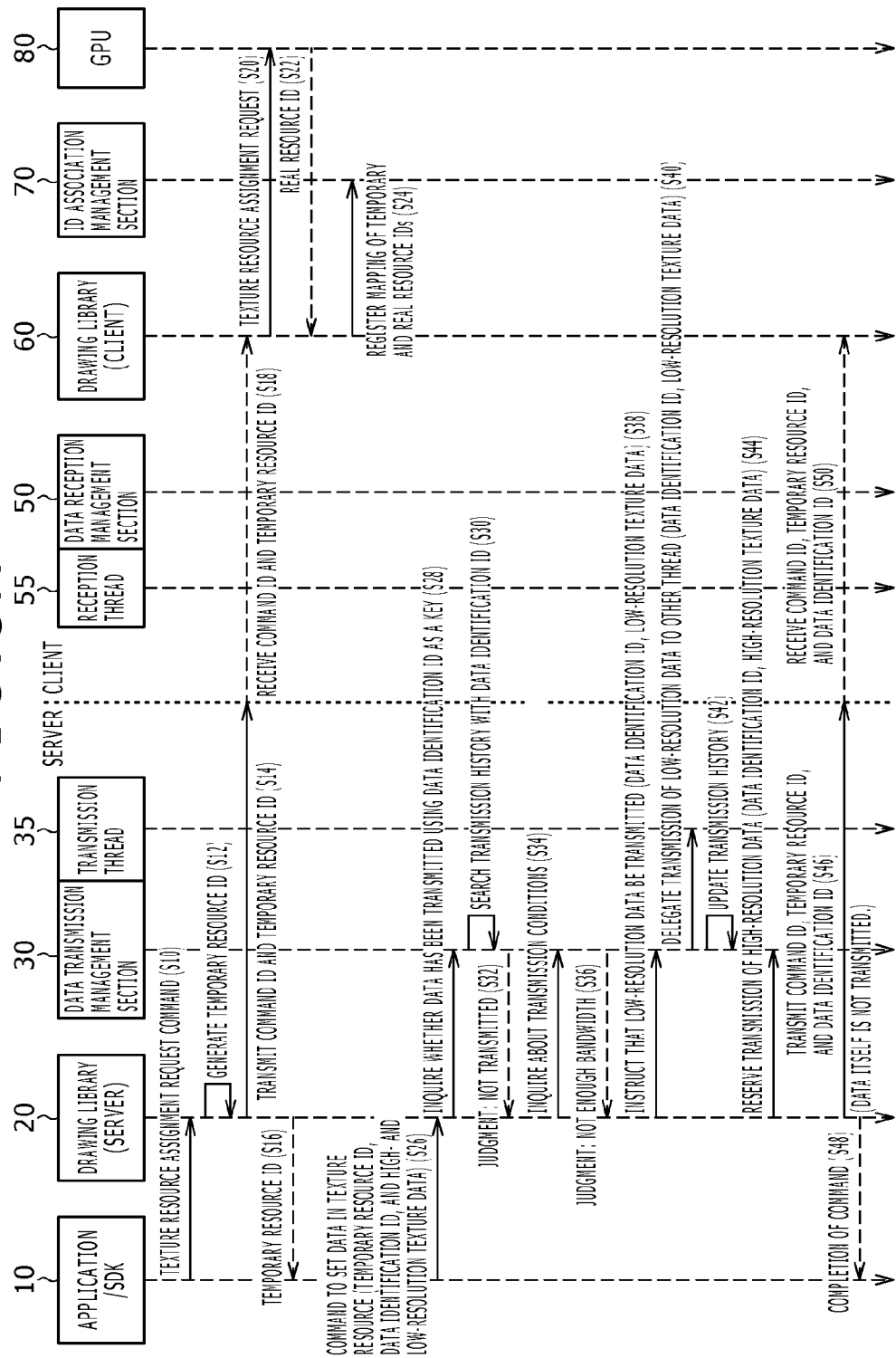
FIG. 3A is a sequence diagram illustrating a flow of texture registration by the drawing processing system shown in FIG. 1.

FIGS. 3A and 3B are sequence diagrams illustrating a flow of texture registration by the drawing processing system.

Referring to FIG. 3A, in the server 100, the application/SDK 10 issues a texture resource assignment request command to the server-side drawing library 20 (S10). The server-side drawing library 20 generates a temporary resource ID in accordance with the texture resource assignment request command (S12).

The drawing library 20 transmits, to the client 200, the ID of the texture resource assignment request command and the temporary resource ID via the network 300 (S14). The drawing library 20 returns the temporary resource ID to the application/SDK 10 (S16).

As described above, as the drawing library 20 of the server 100 issues a temporary resource ID and returns it to the application/SDK 10, it is not necessary to wait for the GPU 80 of the client 200 to issue a real resource ID. This makes it possible to avoid possible delay resulting from connection via the network 300. Further, as will be described later, an old real resource ID is deleted and a new real resource ID issued to replace data assigned to a resource, thereby changing the value of the real resource ID returned from the client 200. As a result, it is necessary for the drawing library 20 of the server 100 to identify the resource using the temporary resource ID which remains unchanged rather than using the real resource ID which is likely to be changed.

In the client 200, the client-side drawing library 60 receives the command ID and the temporary resource ID from the server-side drawing library 20 via the network 300 (S18). The drawing library 60 issues a texture resource assignment request command to the GPU 80 (S20). The GPU 80 generates a real resource ID by executing the texture resource assignment request command and returns the real resource ID to the drawing library 60 (S22).

The drawing library 60 supplies, to the ID association management section 70, mapping information indicating the association between the temporary and real resource IDs, and the ID association management section 70 registers the mapping information (S24). Mapping information associating the temporary and real resource IDs is used to search for a corresponding real resource ID using a temporary resource ID as a key in steps S74, S168, and S138 which will be described later.

As described above, a temporary resource ID is generated by the drawing library 20 of the server 100, whereas a real resource ID is generated by the GPU 80 in response to a request from the drawing library 60 of the client 200. When considering delay caused by the network 300, if the drawing library 20 of the server 100 receives a real resource ID from the drawing library 60 of the client 200, a delay occurs in the execution of the command by the application/SDK 10. Therefore, the drawing library 20 of the server 100 temporarily returns the temporary resource ID to the application/SDK 10. Then, the drawing library 60 of the client 200 associates the real resource ID, issued by the GPU 80, with the temporary resource ID.

In the server 100, the application/SDK 10 issues, to the server-side drawing library 20, a command to set data in the texture resource (S26). This command is given the temporary resource ID, the data identification ID, and high- and low-resolution texture data as arguments.

The drawing library 20 of the server 100 inquires the data transmission management section 30 by using the data identification ID as a key whether the texture data has already been transmitted to the client 200 (S28). A data identification ID is intrinsic information that uniquely identifies texture data. A filename is an example of a data identification ID.

The data transmission management section 30 searches the transmission history based on the data identification ID, thus examining whether the texture data has already been transmitted (S30). The same section 30 returns the judgment result to the drawing library 20 (S32). If the judgment result is "not transmitted," the drawing library 20 inquires the data transmission management section 30 about the transmission conditions of the network 300 (S34). The data transmission management section 30 returns the judgment result to the drawing library 20 (S36). If the judgment result is "not enough bandwidth," the drawing library 20 supplies a low-resolution data transmission instruction to the data transmission management section 30 (S38). This transmission instruction is given the data identification ID and low-resolution texture data as arguments.

The data transmission management section 30 delegates the transmission of the low-resolution data to a transmission thread 35 (S40). At this time, the data identification ID and low-resolution texture data are also given as arguments. The data transmission management section 30 updates the transmission history based on the data identification ID (S42).

Further, the drawing library 20 supplies, to the data transmission management section 30, a reservation for high-resolution data transmission (S44). At this time, the data identification ID and the high-resolution texture data are given as arguments. The drawing library 20 transmits the command ID, the temporary resource ID, and the data identification ID to the client 200 (S46) and notifies the application/SDK 10 that the command is complete (S48). At this time, it is to be noted that data itself is not transmitted. The actual transmission of data is handled by the transmission thread 35 to which the data transmission has been delegated by the data transmission management section 30. In the client 200, the drawing library 60 receives the command ID, the temporary resource ID, and the data identification ID from the server 100 (S50).

Referring to FIG. 3B, the transmission thread 35 of the server 100 transmits the data identification ID and the low-resolution texture data to the client 200 via the network 300 (S52). A reception thread 55 of the client 200 receives the data identification ID and the low-resolution texture data (S54).

On the other hand, the drawing library 60 requests the data reception management section 50 to acquire data using the data identification ID as a key (S56). The data reception management section 50 searches the reception history based on the data identification ID (S58) and returns the judgment result to the drawing library 60 (S60). If the data associated with the data identification ID has yet to arrive as a result of judgment, the drawing library 60 waits for arrival of the data (S62).

Upon completion of reception of the low-resolution texture data from the transmission thread 35, the reception thread 55 registers the low-resolution texture data in a local cache. Then, the same thread 55 updates the reception history based on the data identification ID (S64) and notifies the drawing library 60 that the data has been updated (S66).

The drawing library 60 that has been waiting for arrival of data requests the data reception management section 50 again to acquire data using the data identification ID as a key (S68). The data reception management section 50 searches the reception history based on the data identification ID (S70). Then, if, as a result of judgment, the data has already arrived, the same section 50 supplies the low-resolution texture data stored in the local cache to the drawing library 60 (S72).

The drawing library 60 requests the ID association management section 70 to search for the real resource ID using the temporary resource ID as a key (S74). The ID association management section 70 returns the real resource ID associated with the temporary resource ID to the drawing library 60 (S76).

The drawing library 60 supplies, to the GPU 80, a command to set data in the texture resource (S78). This command is given the real resource ID and the low-resolution texture data as arguments. As a result, the low-resolution texture data is mapped to the real resource ID. Further, the drawing library 60 requests the ID association management section 70 to register mapping information that associates the temporary and real resource IDs and the data identification ID (S80). Mapping information associating the temporary and real resource IDs, and the data identification ID is used to search for the associated temporary and real resource IDs using the data identification ID as a key in step S102 which will be described later.

Figure 4:
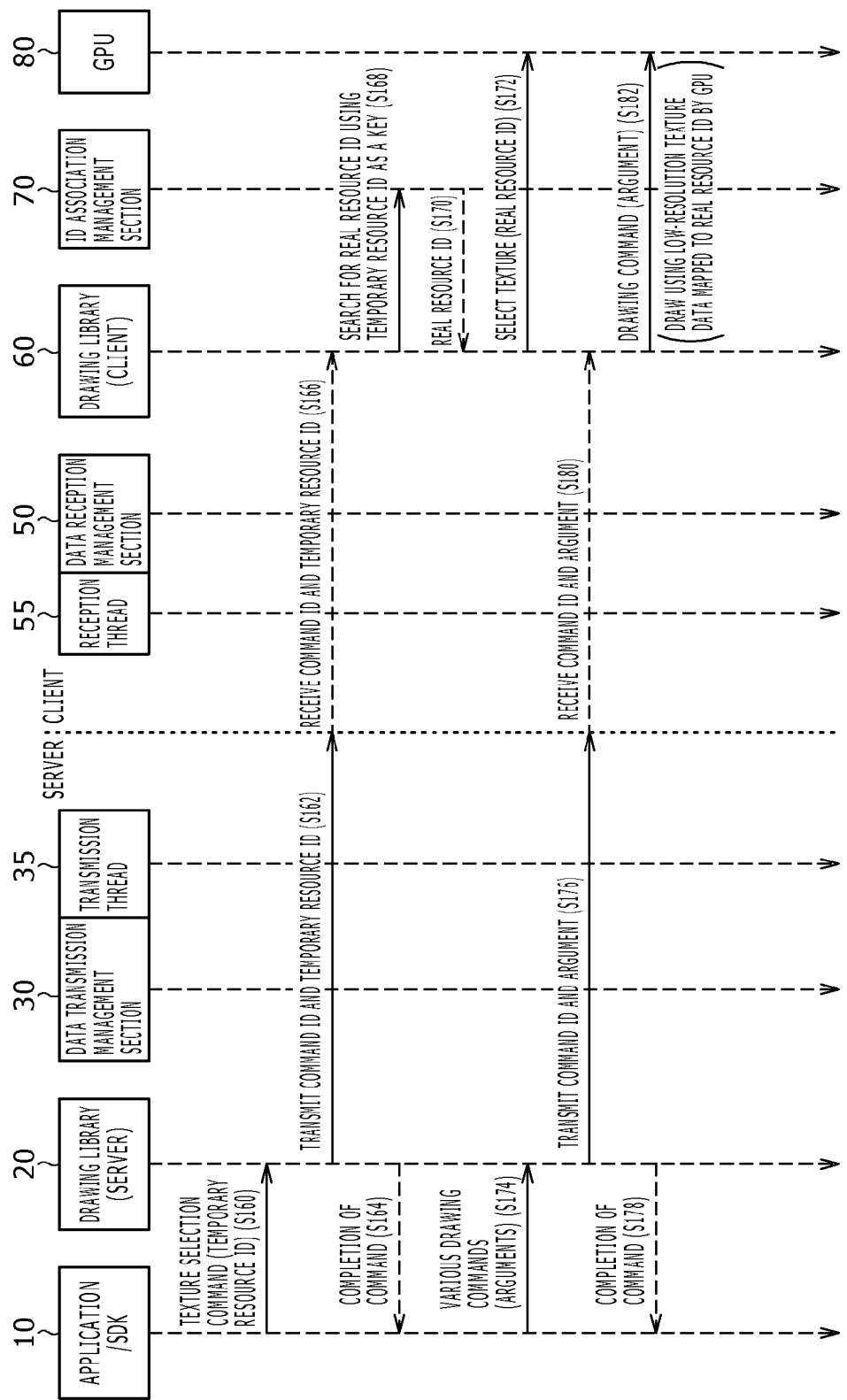
FIG. 4 is a sequence diagram illustrating a flow of a drawing process by the drawing processing system shown in FIG. 1.

FIG. 4 is a sequence diagram illustrating a flow of a drawing process handled by the drawing processing system.

In the server 100, the application/SDK 10 issues, to the drawing library 20, a texture selection command with a temporary resource ID as an argument (S160). The drawing library 20 transmits, to the client 200, the ID of the texture selection command and the temporary resource ID (S162), and notifies the application/SDK 10 that the command is complete (S164).

In the client 200, the drawing library 60 receives the command ID and the temporary resource ID from the server 100 (S166). The drawing library 60 requests the ID association management section 70 to search for the real resource ID using the temporary resource ID as a key (S168). The ID association management section 70 returns the real resource ID associated with the temporary resource ID to the drawing library 60 (S170).

The drawing library 60 supplies, to the GPU 80, a texture selection command with a real resource ID as an argument (S172). The GPU 80 executes the texture selection command. As a result, texture data assigned to the real resource ID is selected.

In the server 100, the application/SDK 10 supplies one of various drawing commands to the drawing library 20 together with a predetermined argument (S174). The drawing library 20 transmits the ID of the drawing command and its argument to the client 200 (S176) and notifies the application/SDK 10 that the command is complete (S178).

In the client 200, the drawing library 60 receives the command ID and its argument from the server 100 (S180). The drawing library 60 supplies the drawing command to the GPU 80 together with its argument (S182). At this time, a drawing process is performed using low-resolution texture data mapped to the real resource ID selected by the GPU 80.

Figure 5:
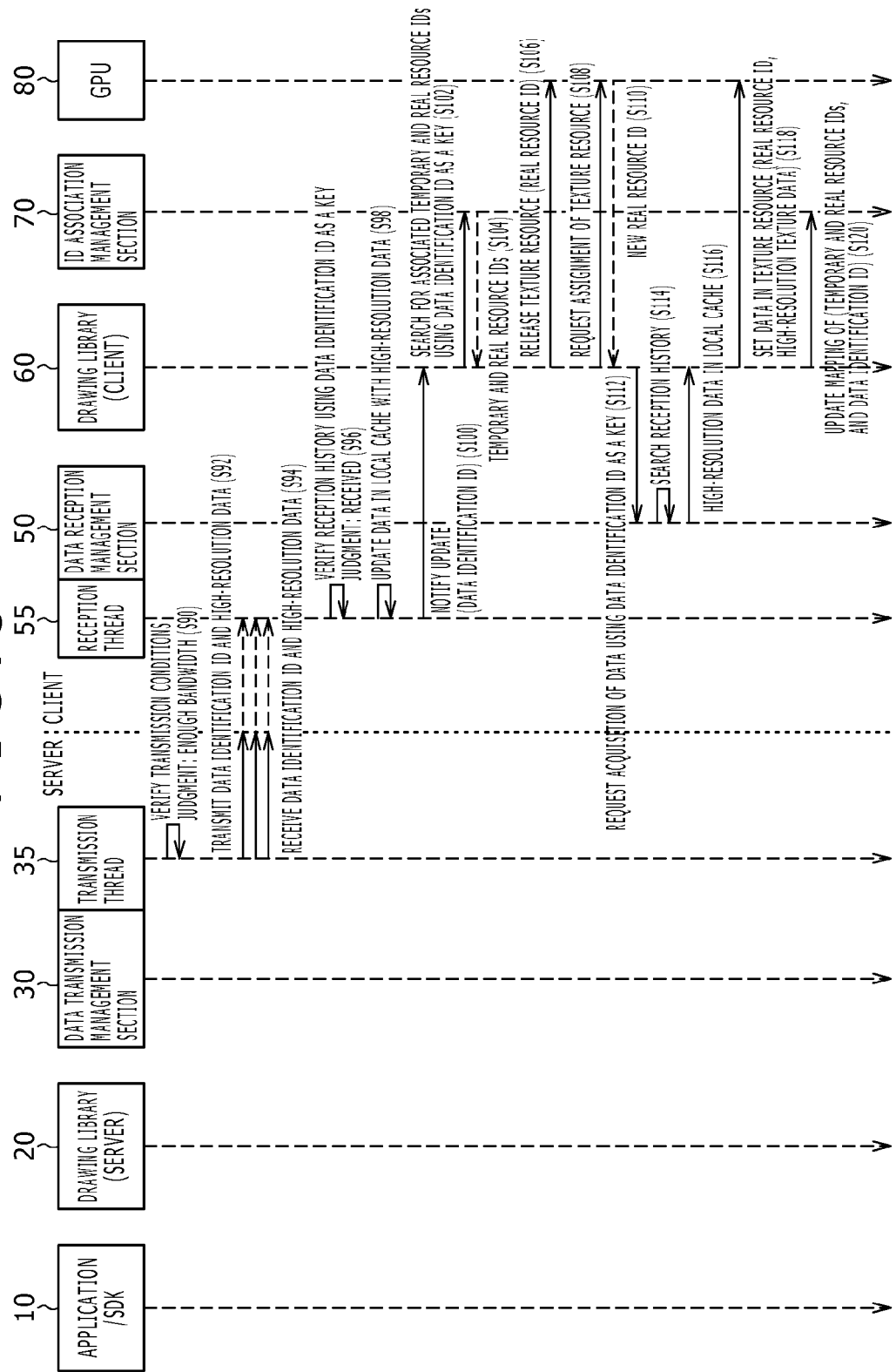
FIG. 5 is a sequence diagram illustrating a flow of texture update by the drawing processing system shown in FIG. 1.

FIG. 5 is a sequence diagram illustrating a flow of texture update by the drawing processing system. As described with reference to FIG. 3A, the drawing library 20 has made a reservation with the data transmission management section 30 for transmission of high-resolution texture data. If the network 300 has enough bandwidth, high-resolution texture data is transmitted by the transmission thread 35 to the client 200.

In the server 100, the transmission thread 35 verifies the transmission conditions of the network 300 (S90). If it is judged that the network 300 has enough available bandwidth, the transmission thread 35 transmits a data identification ID and high-resolution texture data to the client 200 via the network 300 (S92).

In the client 200, the reception thread 55 receives the data identification ID and the high-resolution texture data from the server 100 (S94). The same thread 55 verifies the reception history using the data identification ID as a key (S96). If there is old data received for the data identification ID (low-resolution texture data in this case), the reception thread 55 updates the old data stored in the local cache with the high-resolution texture data (S98). The same thread 55 notifies the drawing library 60 of the data identification ID and that the data has been updated (S100).

The drawing library 60 requests the ID association management section 70 to search for the temporary and real resource IDs using the data identification ID as a key (S102). The ID association management section 70 returns the temporary and real resource IDs, associated with the data identification ID, to the drawing library 60 (S104).

The drawing library 60 supplies, to the GPU 80, a texture resource release command with the real resource ID as an argument (S106). As a result, the GPU 80 releases the resource associated with the real resource ID. The drawing library 60 supplies a texture resource assignment request command to the GPU 80 (S108). The GPU 80 generates a new real resource ID and returns it to the drawing library 60 (S110).

The drawing library 60 requests the data reception management section 50 to acquire data using the data identification ID as a key (S112). The data reception management section 50 searches the reception history based on the data identification ID (S114) and supplies high-resolution texture data, stored in the local cache, to the drawing library 60 (S116).

The drawing library 60 supplies, to the GPU 80, a command to set data in the texture resource (S118). This command is given the new real resource ID and high-resolution texture data as arguments. As a result, the high-resolution texture data is mapped to the real resource ID. Further, the drawing library 60 requests the ID association management section 70 to register mapping information that associates the temporary and new real resource IDs and the data identification ID (S120).

In the above description, in order to replace the low-resolution texture data with the high-resolution texture data, the old real resource ID to which the low-resolution texture data is mapped is temporarily deleted. Then, the high-resolution texture data is mapped to the newly generated real resource ID. Depending on the specification of the GPU 80, it is possible to replace data by mapping new texture data to the same real resource ID without deleting the real resource ID. In this case, it is possible to do without deleting the old resource ID and generating a new real resource ID.

FIG. 6 is a sequence diagram illustrating a flow of a drawing process following replacement of texture data as a result of texture update shown in FIG. 5. The steps of the drawing process following texture update are the same as those of the drawing process shown in FIG. 4. However, these steps differ in the following. That is, when the drawing library 60 gives a drawing command to the GPU 80 in step S182, the GPU 80 draws using the high-resolution texture data mapped to the new real resource ID.

FIG. 7 is a sequence diagram illustrating a flow of texture deletion by the drawing processing system.

In the server 100, the application/SDK 10 issues, to the drawing library 20, a texture resource release command with a temporary resource ID as an argument (S130). The drawing library 20 transmits, to the client 200, the ID of the texture resource release command and the temporary resource ID via the network 300 (S132). The drawing library 20 notifies the application/SDK 10 that the command is complete (S134).

In the client 200, the drawing library 60 receives the command ID and the temporary resource ID from the server 100 (S136). The drawing library 60 requests the ID association management section 70 to search for the real resource ID using the temporary resource ID as a key (S138). The ID association management section 70 returns the real resource ID, associated with the temporary resource ID, to the drawing library 60 (S140).

The drawing library 60 supplies, to the GPU 80, a texture resource release command with the real resource ID as an argument (S142). As a result, the GPU 80 releases the texture resource associated with the real resource ID. The drawing library 60 requests the ID association management section 70 to clear the mapping that associates the temporary and real resource IDs (S144). The ID association management section 70 clears the mapping of the temporary and real resource IDs.

FIGS. 8A and 8B are flowcharts illustrating a process performed by the drawing library 20 of the server 100.

Referring to FIG. 8A, if a command is issued to set data in a texture resource (Y in S200), the process proceeds to step S202. If not (N in S200), the process proceeds to step S218 in FIG. 8B.

In step S202, the drawing library 20 inquires the data transmission management section 30 about the transmission history. If texture data has already been transmitted (Y in S204), the process proceeds to step S216. If texture data has yet to be transmitted (N in S204), the drawing library 20 verifies with the data transmission management section 30 about the current transmission conditions of the network 300 (S206). When the network 300 has enough bandwidth (Y in S208), the drawing library 20 requests the data transmission management section 30 to transmit high-resolution texture data (S210). Then, the process proceeds to step S216. If the network 300 does not have enough bandwidth (N in S208), the drawing library 20 requests the data transmission management section 30 to transmit low-resolution texture data first (S212). Further, the drawing library 20 reserves time-shifted transmission of high-resolution texture data with the data transmission management section 30 (S214). Then, the process proceeds to step S216. Here, the term "time-shifted transmission" refers to data transmission at a different time when the network has enough bandwidth.

In step S216, the drawing library 20 transmits, to the client 200, the ID of the command to set data in the texture resource, the temporary resource ID, and the data identification ID. These IDs are necessary for the client 200 to perform the process.

Referring to FIG. 8B, if a texture resource assignment request command is issued in step S218 (Y in S218), the drawing library 20 generates a temporary resource ID (S220). Then, the same library 20 transmits the ID of the texture resource assignment request command and the temporary resource ID to the client 200 (S222), these IDs being necessary for the client 200 to perform the process, and notifies the application/SDK 10 of the temporary resource ID (S224). If a texture resource assignment request command is not issued in step S218 (N in S218), the process proceeds to step S226.

If a texture selection command is issued in step S226 (Y in S226), the drawing library 20 transmits the ID of the texture selection command and the temporary resource ID to the client 200 (S228). These IDs are necessary for the client 200 to perform the process. If a texture selection command is not issued in step S226 (N in S226), the process proceeds to step S230.

If a texture resource release command is issued in step S230 (Y in S230), the drawing library 20 transmits the ID of the texture resource release command and the temporary resource ID to the client 200 (S232). These IDs are necessary for the client 200 to perform the process. If a command other than a texture resource release command is issued in step S230 (N in S230), the drawing library 20 transmits the ID of that command and the temporary resource ID to the client 200 (S234).

Figure 9A:
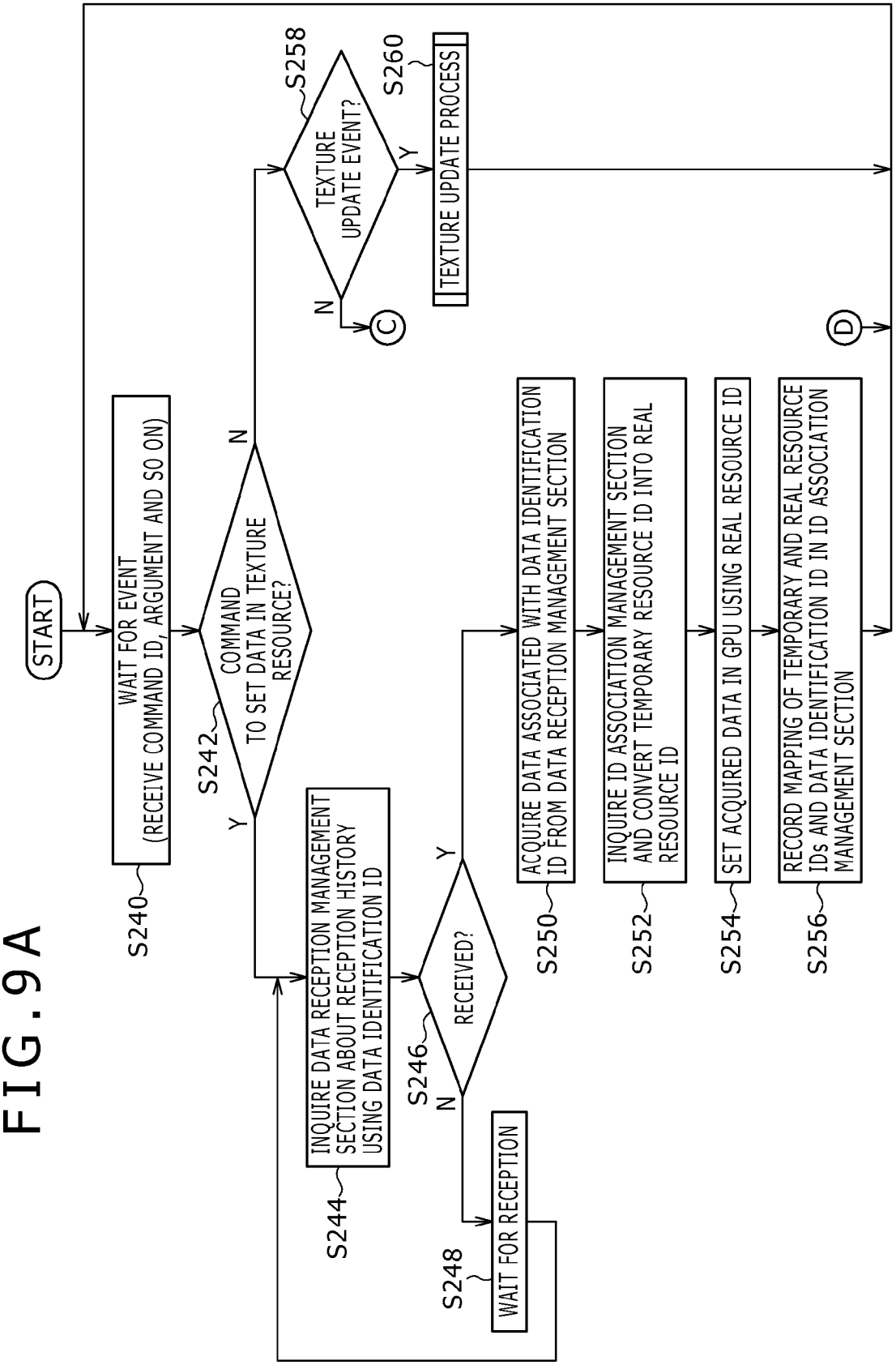
FIG. 9A is a flowchart illustrating a process performed by a drawing library of a client shown in FIG. 1.
Figure 9B:
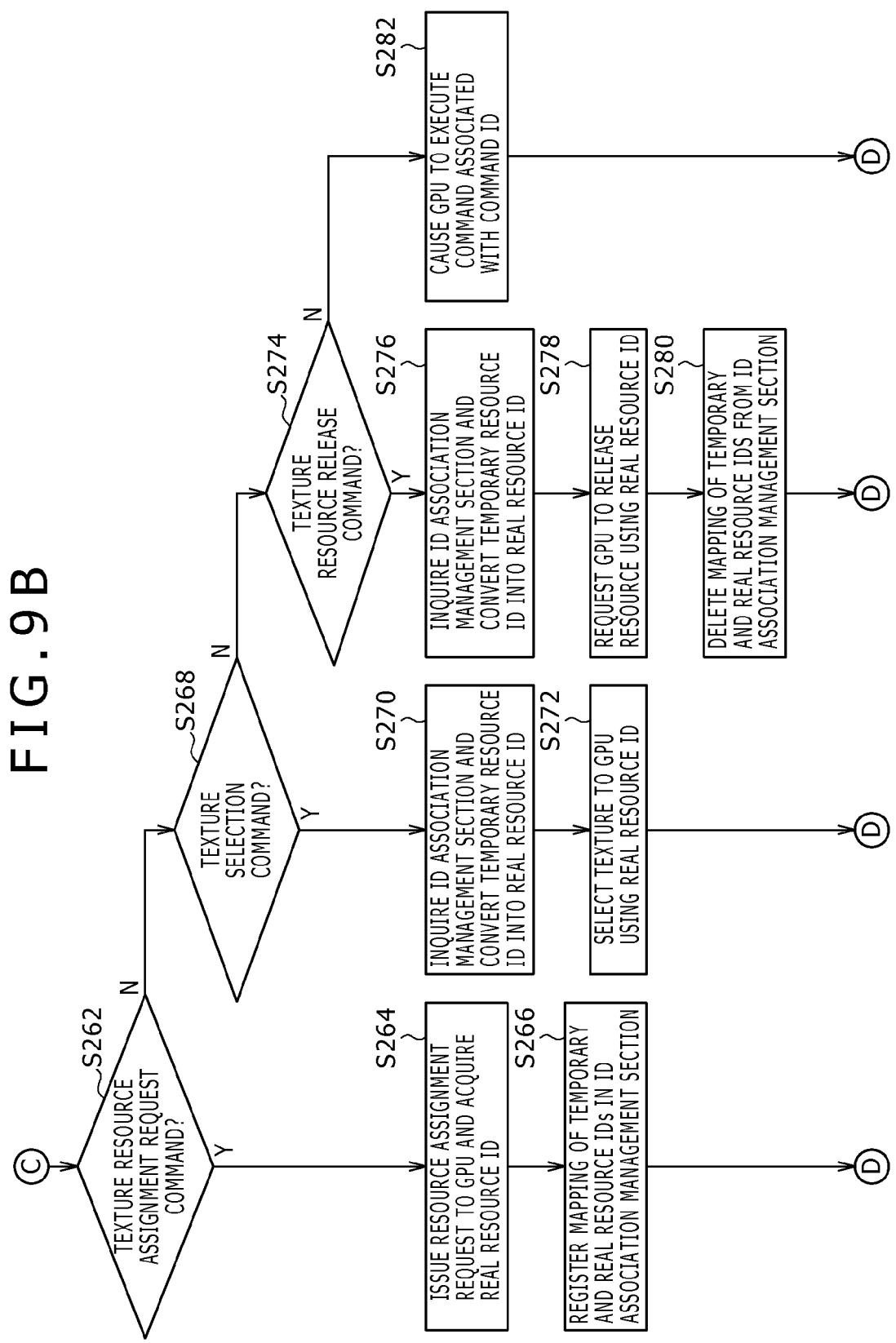
FIG. 9B is a flowchart illustrating the process performed by the drawing library of the client shown in FIG. 1.

FIGS. 9A to 9C are flowcharts illustrating a process performed by the drawing library 60 of the client 200.

Referring to FIG. 9A, the drawing library 60 waits for an event. When an event occurs, the drawing library 60 receives a command ID, an argument and so on (S240).

If the event is a command to set data in a texture resource (Y in S242), the process proceeds to step S244. If not (N in S242), the process proceeds to step S258.

In step S244, the drawing library 60 inquires the data reception management section 50 about the reception history using a data identification ID as a key. If data has yet to be received (N in S246), the drawing library 60 goes into a wait state (S248), and the process returns to step S244. If data has already been received (Y in S246), the drawing library 60 acquires the data associated with the data identification ID from the data reception management section 50 (S250). The drawing library 60 inquires the ID association management section 70 and converts the temporary resource ID into a real resource ID (S252). The same library 60 sets the data, acquired from the data reception management section 50, in the GPU 80 using the real resource ID (S254). The drawing library 60 records the mapping of the temporary and real resource IDs and the data identification ID in the ID association management section 70 (S256), and the process returns to step S240.

If the event is a texture update event in step S258 (Y in S258), the drawing library 60 performs a texture update process (step S260). The details of the texture update process handled by the drawing library 60 will be described with reference to FIG. 9C. If the event is not a texture update event in step S258 (N in S258), the process proceeds to step S262 in FIG. 9B.

Referring to FIG. 9B, if the event is a texture resource assignment request command in step S262 (Y in S262), the drawing library 60 issues a resource assignment request to the GPU 80 and acquires a real resource ID from the GPU 80 (S264). The same library 60 registers the mapping of the temporary and real resource IDs in the ID association management section 70 (S266). If the event is not a texture resource assignment request command in step S262 (N in S262), the process proceeds to step S268.

If the event is a texture selection command in step S268 (Y in S268), the drawing library 60 inquires the ID association management section 70 and converts the temporary resource ID into a real resource ID (S270). The same library 60 selects a texture to the GPU 80 using the real resource ID (S272). If the event is not a texture selection command in step S268 (N in S268), the process proceeds to step S274.

If the event is a texture resource release command in step S274 (Y in S274), the drawing library 60 inquires the ID association management section 70 and converts the temporary resource ID into a real resource ID (S276). The same library 60 requests the GPU 80 to release the resource using the real resource ID (S278). The drawing library 60 deletes the mapping of the temporary and real resource IDs from the ID association management section 70 (S280).

If the event is a command other than a texture resource release command in step S274 (N in S274), the drawing library 60 causes the GPU 80 to execute the command associated with the command ID (S282).

A detailed description will be given of the texture update process in step S260 with reference to FIG. 9C. The drawing library 60 acquires the temporary and real resource IDs associated with the data identification ID from the ID association management section 70 (S284).

The drawing library 60 requests the GPU 80 to release the resource using the real resource ID (S286). The same library 60 issues a resource assignment request to the GPU 80 and acquires a new real resource ID from the GPU 80 (S288).

The drawing library 60 acquires updated data from the data reception management section 50 using the data identification ID (S290). The same library 60 registers the updated data in the GPU 80 using the new real resource ID (S292). The drawing library 60 updates the mapping of the temporary and real resource IDs and the data identification ID in the ID association management section 70 (S294).

[B] Implementation not Using any Data Identification ID

A description will be given of the implementation not using any data identification ID with reference to FIGS. 10A to 13B. In this case, temporary and real resource IDs are managed in association with each other as described later.

FIGS. 10A and 10B are sequence diagrams illustrating a flow of texture registration by the drawing processing system. The same reference symbols are assigned to the same steps as those for the process using a data identification ID shown in FIGS. 3A and 3B.

Referring to FIG. 10A, in the server 100, the application/SDK 10 issues a texture resource assignment request command to the server-side drawing library 20 (S10). The server-side drawing library 20 generates a temporary resource ID in accordance with the texture resource assignment request command (S12).

The drawing library 20 transmits, to the client 200, the ID of the texture resource assignment request command and the temporary resource ID via the network 300 (S14). The drawing library 20 returns the temporary resource ID to the application/SDK 10 (S16).

In the client 200, the client-side drawing library 60 receives the command ID and the temporary resource ID from the server-side drawing library 20 via the network 300 (S18). The drawing library 60 issues a texture resource assignment request command to the GPU 80 (S20). The GPU 80 generates a real resource ID by executing the texture resource assignment request command and returns the real resource ID to the drawing library 60 (S22).

The drawing library 60 supplies, to the ID association management section 70, mapping information indicating the association between the temporary and real resource IDs, and the ID association management section 70 registers the mapping information (S24).

In the server 100, the application/SDK 10 issues, to the server-side drawing library 20, a command to set data in the texture resource (S27). This command is given the temporary resource ID and high- and low-resolution texture data as arguments.

The drawing library 20 inquires the data transmission management section 30 about the transmission conditions of the network 300 (S34). The data transmission management section 30 returns the judgment result to the drawing library 20 (S36). If the judgment result is "not enough bandwidth," the drawing library 20 supplies a low-resolution data transmission instruction to the data transmission management section 30 (S39). This transmission instruction is given the temporary resource ID and low-resolution texture data as arguments.

The data transmission management section 30 delegates the transmission of the low-resolution data to the transmission thread 35 (S41). At this time, the temporary resource ID and low-resolution texture data are also given as arguments.

Further, the drawing library 20 supplies, to the data transmission management section 30, a reservation for high-resolution data transmission (S45). At this time, the temporary resource ID and high-resolution texture data are given as arguments. The drawing library 20 transmits the command ID and the temporary resource ID to the client 200 (S47) and notifies the application/SDK 10 that the command is complete (S48). At this time, it is to be noted that data itself is not transmitted. The actual transmission of data is handled by the transmission thread 35 to which the data transmission has been delegated by the data transmission management section 30. In the client 200, the drawing library 60 receives the command ID and the temporary resource ID from the server 100 (S51).

Referring to FIG. 10B, the transmission thread 35 of the server 100 transmits the temporary resource ID and the low-resolution texture data to the client 200 via the network 300 (S53). The reception thread 55 of the client 200 receives the temporary resource ID and the low-resolution texture data (S55).

On the other hand, the drawing library 60 requests the data reception management section 50 to acquire data using the temporary resource ID as a key (S57). The data reception management section 50 searches the reception history based on the temporary resource ID (S59) and returns the judgment result to the drawing library 60 (S61). If the data associated with the temporary resource ID has yet to arrive as a result of judgment, the drawing library 60 waits for arrival of the data (S63).

Upon completion of reception of the low-resolution texture data from the transmission thread 35, the reception thread 55 registers the low-resolution texture data in the local cache. Then, the same thread 55 updates the reception history based on the temporary resource ID (S65) and notifies the drawing library 60 that the data has been updated (S67).

The drawing library 60 that has been waiting for arrival of data requests the data reception management section 50 again to acquire data using the temporary resource ID as a key (S69). The data reception management section 50 searches the reception history based on the temporary resource ID (S71). Then, if, as a result of judgment, the data has already arrived, the same section 50 supplies the low-resolution texture data stored in the local cache to the drawing library 60 (S73).

The drawing library 60 requests the ID association management section 70 to search for the real resource ID using the temporary resource ID as a key (S74). The ID association management section 70 returns the real resource ID associated with the temporary resource ID to the drawing library 60 (S76).

The drawing library 60 supplies, to the GPU 80, a command to set data in the texture resource (S78). This command is given the real resource ID and the low-resolution texture data as arguments.

A flow of the drawing process performed by the drawing processing system is the same as that shown in FIG. 4. Therefore, the description thereof is omitted.

FIG. 11 is a sequence diagram illustrating a flow of texture update by the drawing processing system. As described with reference to FIG. 10A, the drawing library 20 has made a reservation with the data transmission management section 30 for transmission of high-resolution texture data. If the network 300 has enough bandwidth, high-resolution texture data is transmitted by the transmission thread 35 to the client 200.

In the server 100, the transmission thread 35 verifies the transmission conditions of the network 300 (S90). If it is judged that the network 300 has enough available bandwidth, the transmission thread 35 transmits a temporary resource ID and high-resolution texture data to the client 200 via the network 300 (S93).

In the client 200, the reception thread 55 receives the temporary resource ID and the high-resolution texture data from the server 100 (S95). The same thread 55 verifies the reception history using the temporary resource ID as a key (S97). If there is old data received for the temporary resource ID (low-resolution texture data in this case), the reception thread 55 updates the old data stored in the local cache with the high-resolution texture data (S99). The same thread 55 notifies the drawing library 60 of the temporary resource ID and that the data has been updated (S101).

The drawing library 60 requests the ID association management section 70 to search for the real resource ID using the temporary resource ID as a key (S103). The ID association management section 70 returns the real resource ID, associated with the temporary resource ID, to the drawing library 60 (S105).

The drawing library 60 supplies, to the GPU 80, a texture resource release command with the real resource ID as an argument (S106). As a result, the GPU 80 releases the resource associated with the real resource ID. The drawing library 60 supplies a texture resource assignment request command to the GPU 80 (S108). The GPU 80 generates a new real resource ID and returns it to the drawing library 60 (S110).

The drawing library 60 requests the data reception management section 50 to acquire data using the temporary resource ID as a key (S113). The data reception management section 50 searches the reception history based on the temporary resource ID (S115) and returns high-resolution texture data, stored in the local cache, to the drawing library 60 (S117).

The drawing library 60 supplies, to the GPU 80, a command to set data in the texture resource (S118). This command is given the new real resource ID and high-resolution texture data as arguments. Further, the drawing library 60 requests the ID association management section 70 to register mapping information that associates the temporary and new real resource IDs (S121).

The drawing process, following replacement of texture data as a result of texture update shown in FIG. 11, is the same as that shown in FIG. 6. Therefore, the description thereof is omitted. Texture deletion by the drawing processing system is the same as that shown in FIG. 7. Therefore, the description thereof is omitted.

FIG. 12 is a flowchart illustrating a process performed by the drawing library 20 of the server 100. If a command is issued to set data in a texture resource (Y in S200), the process proceeds to step S206. If not (N in S200), the process proceeds to step S218 in FIG. 8B as with the case of [A] implementation using a data identification ID.

In step S206, the drawing library 20 verifies with the data transmission management section 30 about the current transmission conditions of the network 300. When the network 300 has enough bandwidth (Y in S208), the drawing library 20 requests the data transmission management section 30 to transmit high-resolution texture data (S210). Then, the process proceeds to step S217. If the network 300 does not have enough bandwidth (N in S208), the drawing library 20 requests the data transmission management section 30 to transmit low-resolution texture data first (S212). Further, the drawing library 20 reserves time-shifted transmission of high-resolution texture data with the data transmission management section 30 (S214). Then, the process proceeds to step S217.

In step S217, the drawing library 20 transmits, to the client 200, the ID of the command to set data in the texture resource and the temporary resource ID. These IDs are necessary for the client 200 to perform the process.

Figure 13A:
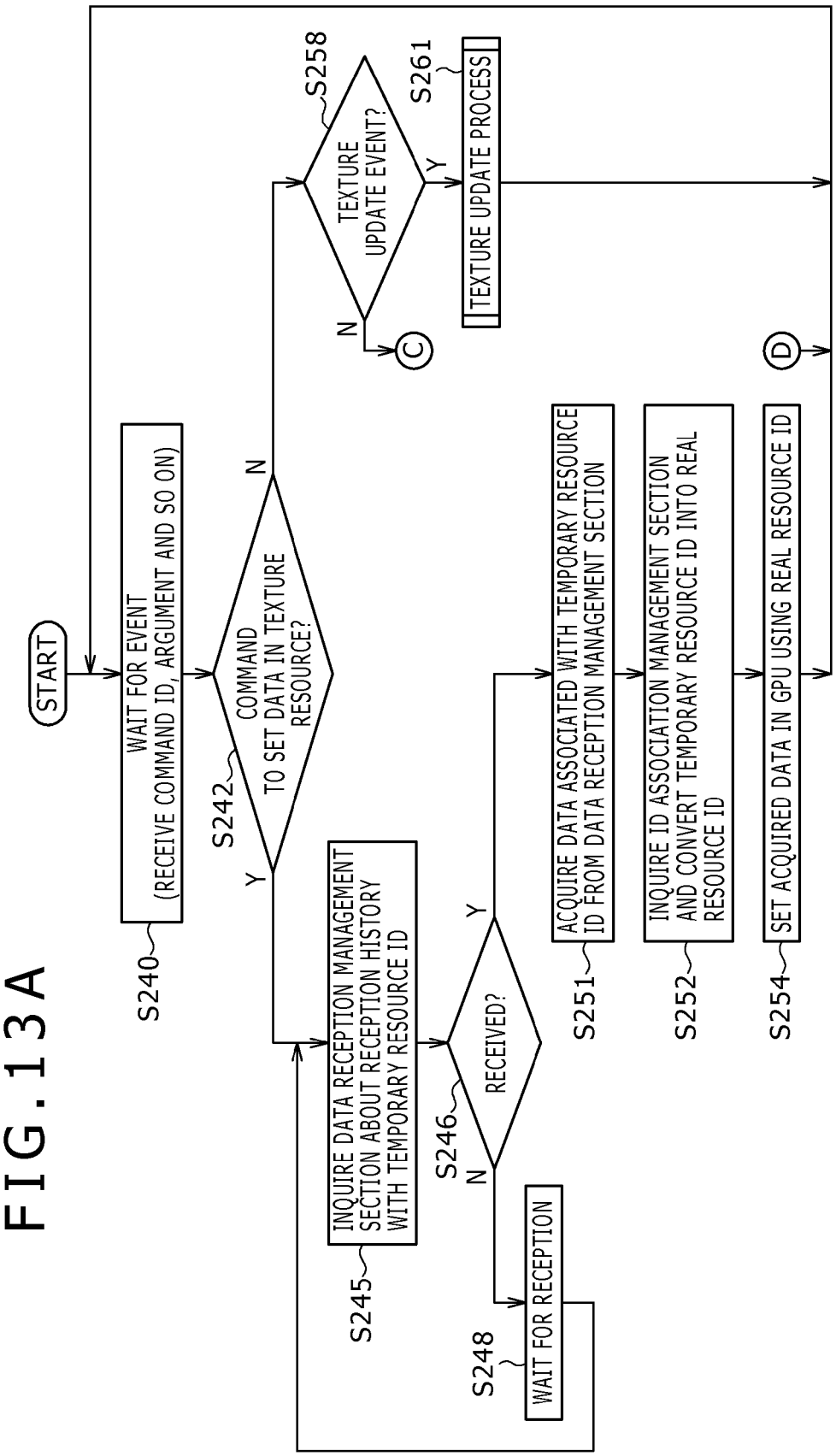
FIG. 13A is a flowchart illustrating another process performed by the drawing library of the client.
Figure 13B:
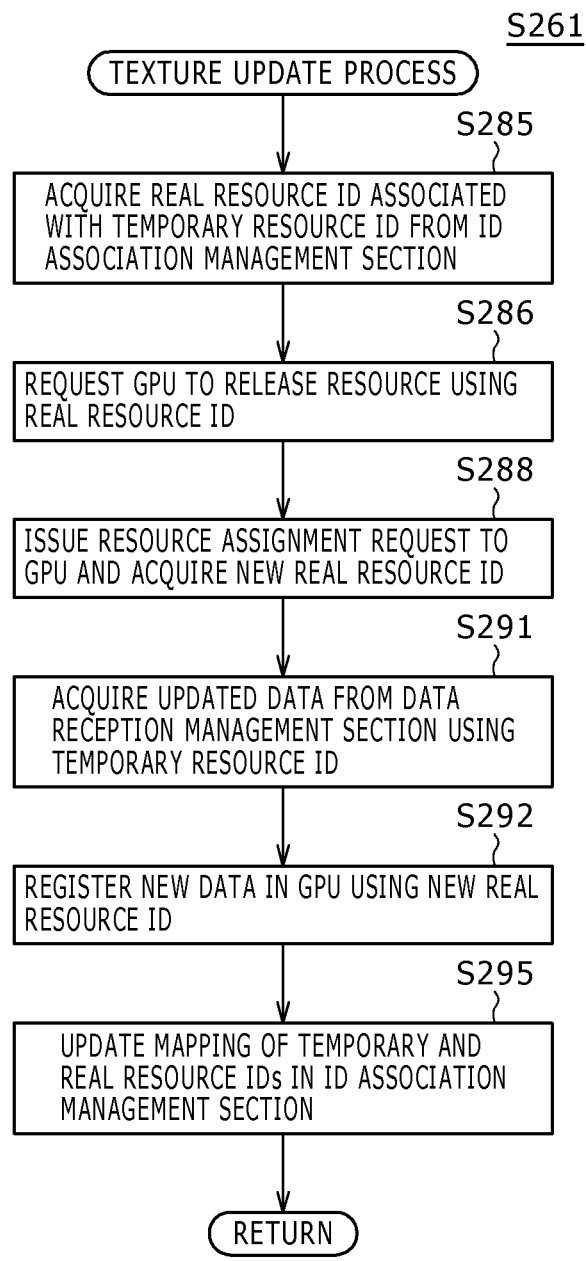
FIG. 13B is a flowchart illustrating the process performed by the drawing library of the client.

FIGS. 13A and 13B are flowcharts illustrating a process performed by the drawing library 60 of the client 200.

Referring to FIG. 13A, the drawing library 60 waits for an event. When an event occurs, the drawing library 60 receives a command ID, an argument and so on (S240).

If the event is a command to set data in a texture resource (Y in S242), the process proceeds to step S245. If not (N in S242), the process proceeds to step S258.

In step S245, the drawing library 60 inquires the data reception management section 50 about the reception history using a temporary resource ID as a key. If data has yet to be received (N in S246), the drawing library 60 goes into a wait state (S248), and the process returns to step S245. If data has already been received (Y in S246), the drawing library 60 acquires the data associated with the temporary resource ID from the data reception management section 50 (S251). The drawing library 60 inquires the ID association management section 70 and converts the temporary resource ID into a real resource ID (S252). The same library 60 sets the data, acquired from the data reception management section 50, in the GPU 80 using the real resource ID (S254). Then, the process returns to step S240.

If the event is a texture update event in step S258 (Y in S258), the drawing library 60 performs a texture update process (step S261). The details of the texture update process handled by the drawing library 60 will be described with reference to FIG. 13B. If the event is not a texture update event in step S258 (N in S258), the process proceeds to step S262 in FIG. 9B as with the case of [A] implementation using a data identification ID.

A detailed description will be given of the texture update process in step S261 with reference to FIG. 13B. The drawing library 60 acquires the real resource ID associated with the temporary resource ID from the ID association management section 70 (S285).

The drawing library 60 requests the GPU 80 to release the resource using the real resource ID (S286). The same library 60 issues a resource assignment request to the GPU 80 and acquires a new real resource ID from the GPU 80 (S288).

The drawing library 60 acquires updated data from the data reception management section 50 using the temporary resource ID (S291). The same library 60 registers the updated data in the GPU 80 using the new real resource ID (S292). The drawing library 60 updates the mapping of the temporary and real resource IDs in the ID association management section 70 (S295).

A description will be given below of some working examples of the drawing processing system in the present embodiment.

[1] Working Example 1

Averaging Data Traffic

In the present working example, the network load conditions are monitored. Data traffic is averaged by dynamically replacing data if the network lacks in available bandwidth. In the present working example, data is transmitted after a temporary resource ID is issued in response to a resource assignment request. Therefore, a data identification ID is not typically necessary. It is only necessary that temporary and real resource IDs are associated with each other. Therefore, the present working example can be achieved by using either of [A] implementation using a data identification ID and [B] implementation not using any data identification ID.

In the server 100, when a network monitoring device judges that the available bandwidth of the network 300 will be exceeded as a result of intended transmission of data, the data transmission management section 30 of the server 100 transmits low-resolution data, data in small amount, instead to the client 200. Low-resolution data prepared in advance may be used. Alternatively, low-resolution data may be dynamically generated. On the other hand, the data transmission management section 30 may reserve transmission of high-resolution data, data originally intended to be transmitted, so that data is updated by transmitting high-resolution data when the network 300 has enough available bandwidth.

In the client 200, the data reception management section 50 receives and stores the low-resolution data, and the drawing library 60 sets the low-resolution data in the GPU 80. The GPU 80 performs a drawing process using the low-resolution data. Upon receipt of high-resolution data, the data reception management section 50 updates this data, and the drawing library 60 sets the high-resolution data in the GPU 80. The GPU 80 performs a drawing process using the high-resolution data from here onwards.

As described above, in the working example 1, the server 100 transmits static data to the client 200 separately from a command. If the network is under high load, low-quality data, data in small amount, is transmitted first. Then, when the network is under low load, high-quality data, data in large amount, is transmitted through time-shifted transmission. This averages the data traffic, thus avoiding network congestion and providing reduced response delay in the drawing processing system as a whole. Response performance can be enhanced particularly when an application, such as a game, for which realtimeness is necessary is executed.

[2] Working Example 2

Providing Improved Error Resistance

In the present working example, if an error occurs during data transmission or if data is damaged, the client 200 continuously executes an application using dummy data. When the server 100 recovers from the error and transmits correct data, the client 200 performs a necessary drawing process. For example, if texture data is not transmitted properly due to an error, the client 200 performs a drawing process using a dummy texture. Then, when the server 100 recovers from the error, the client 200 receives a correct texture and performs texture mapping once again. In the present working example, data is transmitted after a temporary resource ID is issued in response to a resource assignment request. Therefore, a data identification ID is not typically necessary. It is only necessary that temporary and real resource IDs are associated with each other. Therefore, the present working example can be achieved by using either of [A] implementation using a data identification ID and [B] implementation not using any data identification ID.

In the server 100, the network monitoring device detects a data transmission error of the network 300. The data transmission management section 30 of the server 100 reserves retransmission of data.

In the client 200, if data requested by the drawing library 60 has yet to arrive at the data reception management section 50, the same library 60 sets dummy data in the GPU 80. The GPU 80 performs a drawing process using the dummy data. If data is retransmitted, the data reception management section 50 stores the data, and the drawing library 60 sets the correct data in the GPU 80. The GPU 80 performs a drawing process using the correct data from here onwards.

As described above, in the working example 2, the server 100 transmits static data to the client 200 separately from a command. If an error occurs during data transfer through a network, the GPU 80 performs a drawing process using the dummy data. Data is retransmitted at a different time. This provides improved error resistance in network transfer, thus contributing to reduced response delay in the drawing processing system as a whole.

[3] Working Example 3

Data Transfer in Advance

In the present working example, texture and model data is transferred in advance while a game's title screen appears. In the present working example, data is transferred before a temporary resource ID is issued in response to a resource assignment request. Therefore, a data identification ID that uniquely identifies data is necessary. The present working example can be achieved by using [A] implementation using a data identification ID.

In the server 100, the data transmission management section 30 transmits data necessary for a drawing process one after another in advance. When the application/SDK 10 issues a drawing command, the data transmission management section 30 skips transmission of data that has been transmitted.

In the client 200, the data reception management section 50 stores received data. If data is requested by the drawing library 60, the same section 50 supplies the stored data to the drawing library 60. The GPU 80 receives the data from the drawing library 60 and performs a drawing process.

As described above, in the working example 3, the server 100 transmits static data to the client 200 separately from a command. Data necessary for a drawing process is transmitted at a different time in advance. This provides necessary lower peak performance even for a smaller network bandwidth, thus ensuring trouble-free operation and providing reduced response delay in the drawing processing system as a whole.

In the working examples 1 to 3, data and a command are transmitted separately. Data necessary for execution of the command is transmitted at a different time. In the working examples 1 and 2, data is transmitted after a command is transmitted. In contrast, in the working example 3, data is transmitted in advance. In any of these cases, data is transmitted at a different time. This averages data traffic during network congestion or provides improved error resistance.

Further, in the working example 1, it is possible to replace low-quality data that has been transmitted first with high-quality data transmitted later by using a data update mechanism. This provides enhanced drawing quality when the network congestion is resolved. Also in the working example 2, it is possible to replace old data damaged due to network congestion with new undamaged data by using the data update mechanism.

[4] Working Example 4

Switching between Data Sets

In the present working example, a data set to be transmitted from the server 100 to the client 200 is switched according to the client performance and the network performance. In the present working example, data is transmitted after a temporary resource ID is issued in response to a resource assignment request. Therefore, a data identification ID is not typically necessary. It is only necessary that temporary and real resource IDs are associated with each other. Therefore, the present working example can be achieved by using either of [A] implementation using a data identification ID and [B] implementation not using any data identification ID.

In the server 100, the performance of the client 200 or the network 300 is investigated. The data transmission management section 30 selects either a low- or high-resolution data set according to the performance and transmits the selected data set.

In the client 200, the data reception management section 50 stores data received from the server 100. If data is requested by the drawing library 60, the same section 50 supplies the stored data to the drawing library 60. The GPU 80 receives the data from the drawing library 60 and performs a drawing process.

As described above, in the working example 4, the server 100 transmits static data to the client 200 separately from a command. The server 100 selects either a low- or high-resolution data set according to the client or network performance and transmits the selected data set. This keeps network traffic to a minimum according to the performance, thus providing reduced response delay in the drawing processing system as a whole. Unlike the working examples 1 and 2, a selected data set is transmitted from the beginning without updating the data, further keeping the data traffic to a minimum.

[5] Working Example 5

Customizing Data

In the present working example, the client 200 customizes its own texture and model data for use. In the present working example, a data identification ID that uniquely identifies data is necessary to instruct that data should be replaced. The present working example can be achieved by using [A] implementation using a data identification ID.

In the client 200, the drawing library 60 sets data customized as appropriate on the client side in the GPU 80 without being restrained by data received by the data reception management section 50 from the server 100. The GPU 80 performs a drawing process using the data replaced by the drawing library 60.

As described above, in the working example 5, the server 100 transmits static data to the client 200 separately from a command. Data is customized as appropriate by the client side for use. This permits a user to customize texture and model data, thus allowing for flexible drawing process.

A description has been given above of the present disclosure by way of embodiments. The embodiments are illustrative. It is understood by those skilled in the art that the combination of the components and processes can be modified in various ways, and that these modification examples are also within the scope of the present disclosure.

In the above description, texture data is primarily cited as an example of data transmitted from the server 100 to the client 200 separately from a command to explain the embodiments. The processes remain unchanged even if data to be transmitted is object model data such as vertex data.

Although identification information has been represented as "IDs" as done for such as temporary and real resource IDs and data identification ID, a variety of implementations are available depending on the application programming interface (API) including use of a handle and an instance pointer. Therefore, arbitrary identification information can be used as long as it allows unique identification in some way. As for data identification ID, arbitrary identification information can also be used as long as it allows unique identification of data in some way such as using a file name.

In the above description, the server 100 generates a temporary resource ID. However, the client 200 may generate a temporary resource ID and return it to the server 100. It should be noted, however, that this may lead to a delay resulting from transfer of a temporary resource ID, thus resulting in lower response speed.

The present disclosure contains subject matter related to that disclosed in Japanese Priority Patent Application JP 2013-076188 filed in the Japan Patent Office on Apr. 1, 2013, the entire content of which is hereby incorporated by reference.

What is claimed is:

1. A drawing processing apparatus comprising:
 a drawing library section of a server that transmits a drawing command to a drawing library of a client via a network; and
 a data transmission management section of said server that transmits reusable data, used to execute the drawing command, to said client via the network at a time different from when the drawing command is transmitted, wherein: (i) said reusable data comprises texture and model data which is stored in a cache of said client drawing processing apparatus, (ii) the server generates and transmits a temporary resource ID for the reusable data to the client, which is used to identify a resource that is necessary for execution of the drawing command by the client, (iii) the client maps a real resource ID, used to identify a resource actually assigned by the client, and the temporary resource ID to one another, and (iv) the reusable data includes a unique data ID that is mapped to the temporary and real resource ID's, and said reusable data ID is used to search for the temporary and real resource ID's by the client,
 wherein the data transmission management section transmits one of a first type and a second type of the reusable data to said client, said first type comprising low-quality texture and model data and said second type comprising high-quality texture and model data, wherein selection of one of said first and second type of reusable data for transmission is performed in accordance with an available bandwidth of the network or the processing capability of the client.

2. The drawing processing apparatus of claim 1, wherein the data transmission management section transmits the reusable data later than when the drawing command is transmitted.

3. The drawing processing apparatus of claim 1, wherein the data transmission management section transmits, of two types of the reusable data having different drawing qualities, lower quality data at a different time from when the drawing command is transmitted first, and the data transmission management section determines whether to transmit higher quality data of the two types of data in accordance with a congestion condition of the network.

4. A client drawing processing apparatus comprising:
 a data reception management section adapted to receive reusable data from a server, said reusable data is used to execute a drawing command issued by a drawing library of said server, wherein said reusable data is received via a network at a time different from when the drawing command is received, wherein said reusable data comprises texture and model data which is stored by said data reception management section in a cache of said client drawing processing apparatus; and
 a client drawing library section adapted to set the reusable data, received by the data reception management section, in a graphics processor of said client as a resource and adapted to receive the drawing command via the network and supply the drawing command to the graphics processor,
 an ID association management section adapted to register temporary and real resource ID's mapped to each other, the temporary resource ID being generated and transmitted by said server and received by the drawing library section of said client so as to be used to identify a resource that is necessary for execution of the drawing command by the client, the real resource ID being used to identify a resource actually assigned by the graphics processor,
 wherein said reusable data has a unique data ID that is mapped to the temporary and real resource ID's, and said reusable data ID is used to search for the temporary and real resource ID's;
 the drawing library section acquiring the real resource ID, associated with the temporary resource ID received via the network, from the identification association management section, and requesting the graphics processor to set the reusable data, received by the data reception management section, in a resource identified by the real resource ID acquired from the ID association management section, such that said graphic processor assigns said texture and model data to said identified resource when executing the drawing command.

5. The drawing processing apparatus of claim 4, wherein if the reusable data to be received by the data reception management section later than when the drawing command is received is not received, the drawing library section sets dummy data in the graphics processor as a resource.

6. A drawing processing system comprising:
 a server that transmits a drawing command via a network; and
 a client that receives the drawing command from the server,
 the server including
 a server-side drawing library section that transmits the drawing command to the client, and
 a data transmission management section that transmits, to the client, reusable data, used to execute the drawing command, at a time different from when the drawing command is transmitted,
 the client including
 a data reception management section adapted to receive, from the server, the reusable data used to execute the drawing command, wherein said reusable data comprises texture and model data which is stored by said data reception management section in a cache of the client, and a client-side drawing library section adapted to set the reusable data, received by the data reception management section, in a graphics processor as a resource and adapted to receive the drawing command from the server and supply the drawing command to the graphics processor, wherein the server-side drawing library section generates a temporary resource ID used to identify a resource that is necessary for execution of the drawing command and transmits the temporary resource ID to the client-side drawing library section, the client-side drawing library section requests the graphics processor to assign a resource that is necessary for execution of the drawing command and receives, from the graphics processor, a real resource ID used to identify the resource actually assigned by the graphics processor, the client further comprising an ID association management section adapted to register the temporary and real resource identifications so they are mapped with each other, and the client-side drawing library section acquires, from the ID association management section, the real resource ID mapped with the temporary resource ID received from the server-side drawing library section and requests the graphics processor to set the reusable data, received by the data reception management section, in a resource identified by the real resource ID acquired from the ID association management section, such that said graphic processor assigns said texture and model data to said identified resource when executing the drawing command.

7. A drawing processing method comprising:
transmitting a drawing command from a server to a client via a network;
transmitting one of a first type and a second type of reusable data to said client, said first type comprising low-quality texture and model data and said second type comprising high-quality texture and model data, wherein selection of one of said first and second types of reusable data for transmission is performed in accordance with an available bandwidth of the network or the processing capability of said client, and wherein: (i) said reusable data comprises texture and model data which is stored in a cache of said client drawing processing apparatus, (ii) the server generates and transmits a temporary resource ID for the reusable data to the client, which is used to identify a resource that is necessary for execution of the drawing command by the client, (iii) the client maps a real resource ID, used to identify a resource actually assigned by the client, and the temporary resource ID to one another, and (iv) the reusable data includes a unique data ID that is mapped to the temporary and real resource ID's, and said reusable data ID is used to search for the temporary and real resource ID's by the client;
transmitting the reusable data, used to execute the drawing command, via a network at a time different from when the drawing command is transmitted;
receiving the reusable data used to execute the drawing command; and
setting the received reusable data in a graphics processor as a resource, receiving the drawing command via the network, and supplying the drawing command to the graphics processor.

* * * * *